US 8,998,537 B2

(12) United States Patent
Cherrington

(10) Patent No.: US 8,998,537 B2
(45) Date of Patent: *Apr. 7, 2015

(54) METHOD AND PORTABLE APPARATUS FOR FORCING A PIPELINE INTO OR OUT OF A BOREHOLE

(76) Inventor: Martin Cherrington, Fair Oaks, CA (US)

(*) Notice: Subject to any disclaimer, the term of this patent is extended or adjusted under 35 U.S.C. 154(b) by 249 days.

This patent is subject to a terminal disclaimer.

(21) Appl. No.: 13/562,247

(22) Filed: Jul. 30, 2012

(65) Prior Publication Data

US 2013/0028665 A1  Jan. 31, 2013

Related U.S. Application Data

(60) Provisional application No. 61/513,433, filed on Jul. 29, 2011, provisional application No. 61/619,180, filed on Apr. 2, 2012.

(51) Int. Cl.
  *F16L 1/028* (2006.01)
  *E21B 7/20* (2006.01)

(52) U.S. Cl.
  CPC ........................................ *E21B 7/20* (2013.01)

(58) Field of Classification Search
  CPC ........... F16L 1/028; F16L 1/032; F16L 1/036; E21B 7/20
  USPC ................ 405/174, 184, 184.1, 184.2, 184.3, 405/184.4; 254/29 R
  See application file for complete search history.

(56) References Cited

U.S. PATENT DOCUMENTS

| 3,726,506 | A | * | 4/1973 | Vanderwaal et al. ........ 254/29 R |
| 3,834,668 | A | * | 9/1974 | Casey .......................... 254/29 R |
| 3,871,618 | A |   | 3/1975 | Funk |
| 3,881,558 | A | * | 5/1975 | Dolza ............................ 405/184 |
| 4,121,673 | A |   | 10/1978 | Cherrington |
| 4,221,503 | A |   | 9/1980 | Cherrington |
| 4,434,969 | A |   | 3/1984 | Von Ruden |
| 4,455,107 | A | * | 6/1984 | Schosek ........................ 405/184 |
| 4,746,096 | A | * | 5/1988 | Donnell et al. .............. 254/29 R |
| 4,955,757 | A |   | 9/1990 | Balling |
| 5,159,860 | A |   | 11/1992 | Pietras |

(Continued)

FOREIGN PATENT DOCUMENTS

| EP | 0411967 A1 | 2/1991 |
| EP | 0767289 A1 | 4/1997 |

(Continued)

OTHER PUBLICATIONS http://www.youtube.com/watch?v=X4xhalY20k4; Cherrington Shore Landings, Horizontal Directional Drilling, Mar. 2002, Video Screenshot, 1 sheet.

(Continued)

*Primary Examiner* — Frederick L Lagman
(74) *Attorney, Agent, or Firm* — Christie, Parker & Hale, LLP

(57) ABSTRACT

A portable pipe thrusting apparatus for inserting and removing a pipe from a borehole, comprising a collar configured to releasably grip the pipe; and a bi-directional driver coupled between the collar and the support frame, the driver configured to drive the collar toward and away from the borehole, to insert and remove the pipe from the borehole, wherein the support frame is portable and is transportable by a truck to the drilling site.

37 Claims, 21 Drawing Sheets

(56) References Cited

U.S. PATENT DOCUMENTS

| | | | |
|---|---|---|---|
| 5,303,783 A | | 4/1994 | Begnaud et al. |
| 5,375,945 A | | 12/1994 | Cherrington |
| 6,238,141 B1 | * | 5/2001 | Puttmann et al. ............ 405/184 |
| 6,244,783 B1 | * | 6/2001 | Puttmann et al. ............ 405/184 |
| 6,481,930 B2 | | 11/2002 | Forrest |
| 6,536,539 B2 | | 3/2003 | Merecka et al. |
| 6,851,490 B2 | | 2/2005 | Cherrington |
| 7,748,471 B2 | | 7/2010 | Osadchuk et al. |
| 7,942,609 B2 | | 5/2011 | Koegler |
| 7,963,722 B2 | | 6/2011 | Kögler |
| 8,628,273 B2 | * | 1/2014 | Cherrington ............ 405/184 |
| 8,727,666 B2 | * | 5/2014 | Farley et al. ............ 405/184 |
| 2002/0112890 A1 | | 8/2002 | Wentworth et al. |
| 2004/0028476 A1 | * | 2/2004 | Payne et al. ............ 405/184 |
| 2009/0185866 A1 | | 7/2009 | Koegler |
| 2012/0230771 A1 | * | 9/2012 | Farley et al. ............ 405/184 |

FOREIGN PATENT DOCUMENTS

| | | |
|---|---|---|
| WO | WO 03/033952 A1 | 4/2003 |
| WO | WO 2011/150341 A2 | 12/2011 |

OTHER PUBLICATIONS

Coe Drilling Australia, Pty Ltd., Coe Drilling Australia Successfully Completes BASSGAS HDD Shore Crossing, Press Release, Oct. 24, 2003, 2 sheets.

HerrenknechtAG, More Power Reserves for Pipeline Construction, Herenknecht News, 2007, 2 sheets.

Vermeer D500X500 Product Literature, 5 sheets.

http://hydrafabinc.com/#, Pipe Thrust Device Video, Video Screenshot, 1 sheet.

International Search Report dated Apr. 12, 2013 for International Application PCT/US2013/048898, 4 sheets.

International Search Report dated Apr. 12, 2013 for International Application PCT/US2013/048886, 4 sheets.

A.Hak Drillcon, Direct Pipe Drilling Method with a Length of 1.400 meters; http://www.a-hakdrillcon.nl/english/direct-pipe-drilling-of-1-400-m, Spring 2011, 3 pgs.

A.Hak Drillcon, World Record Direct Pipe Drilling; http://issuu.com/drillcon/docs/0323_ommen-seveld_gb3, Spring 2011, 2 pgs.

* cited by examiner

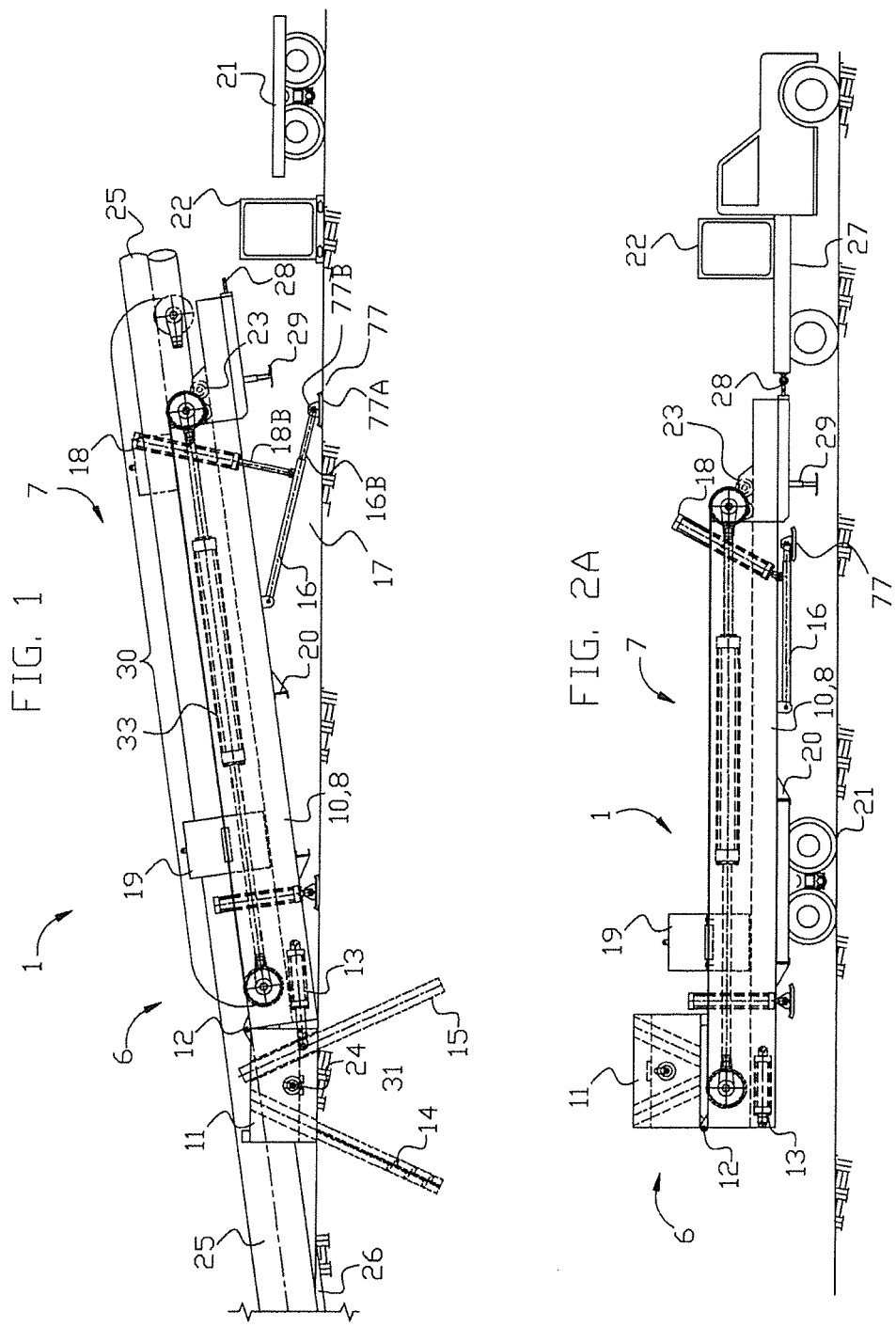

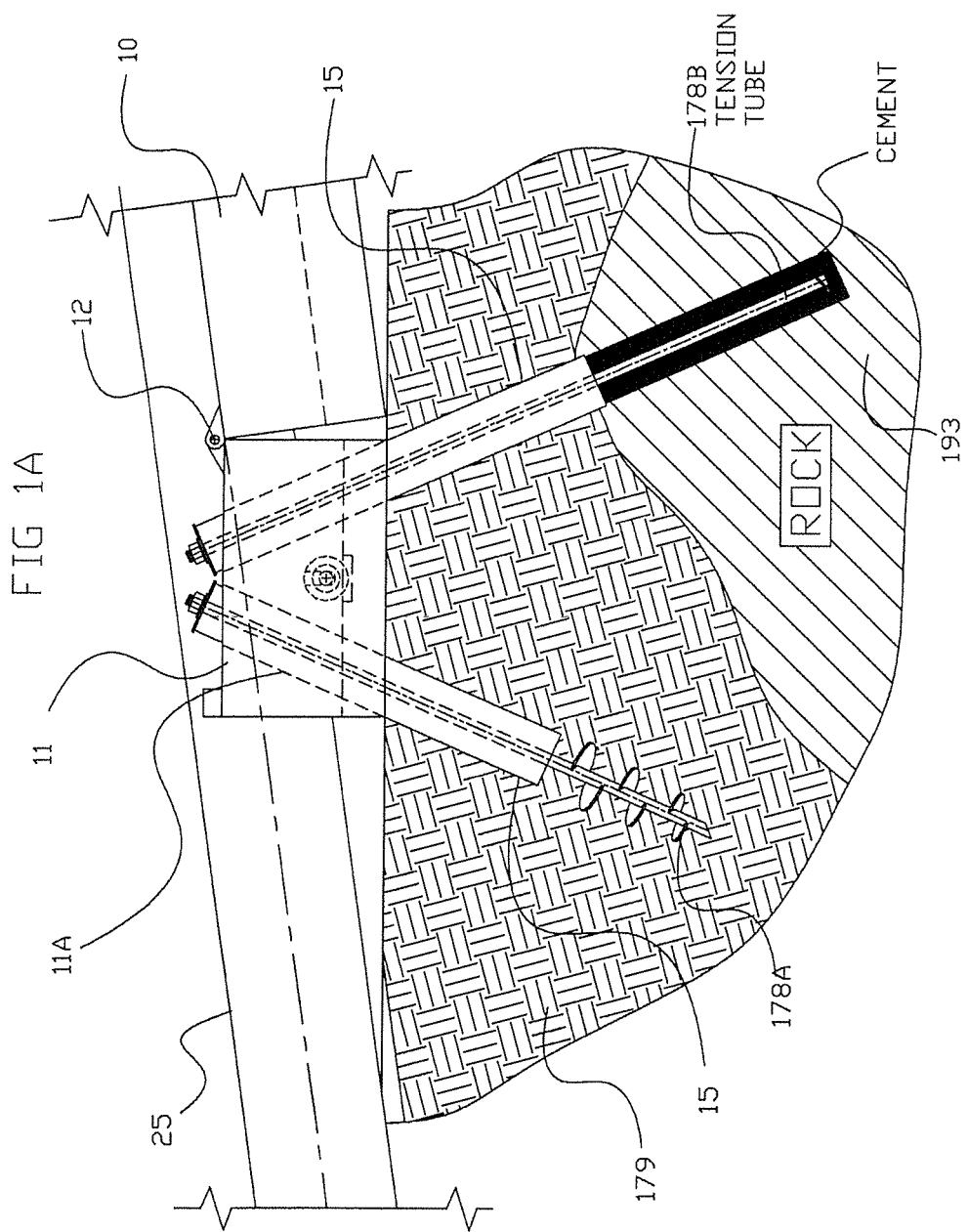

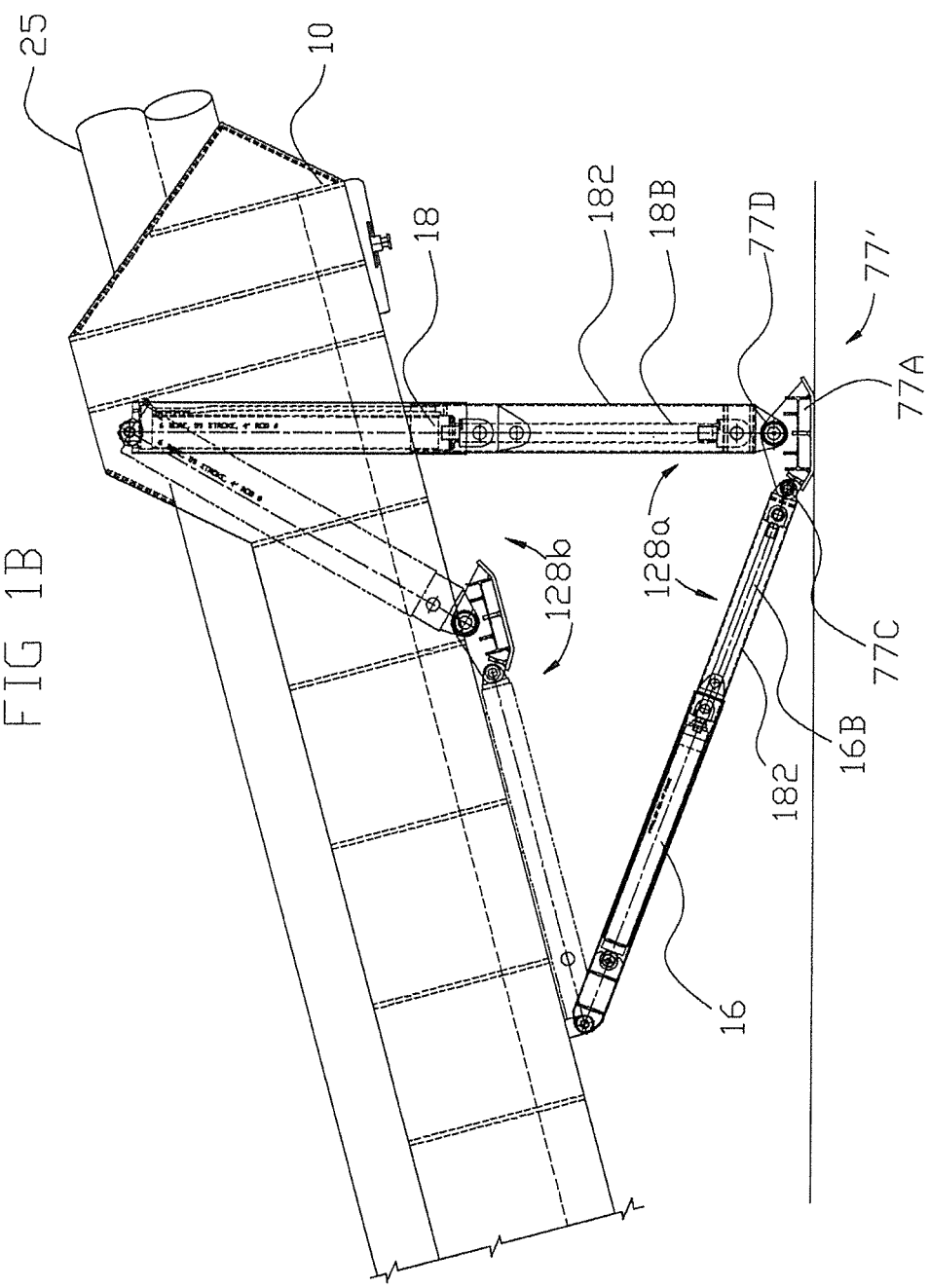

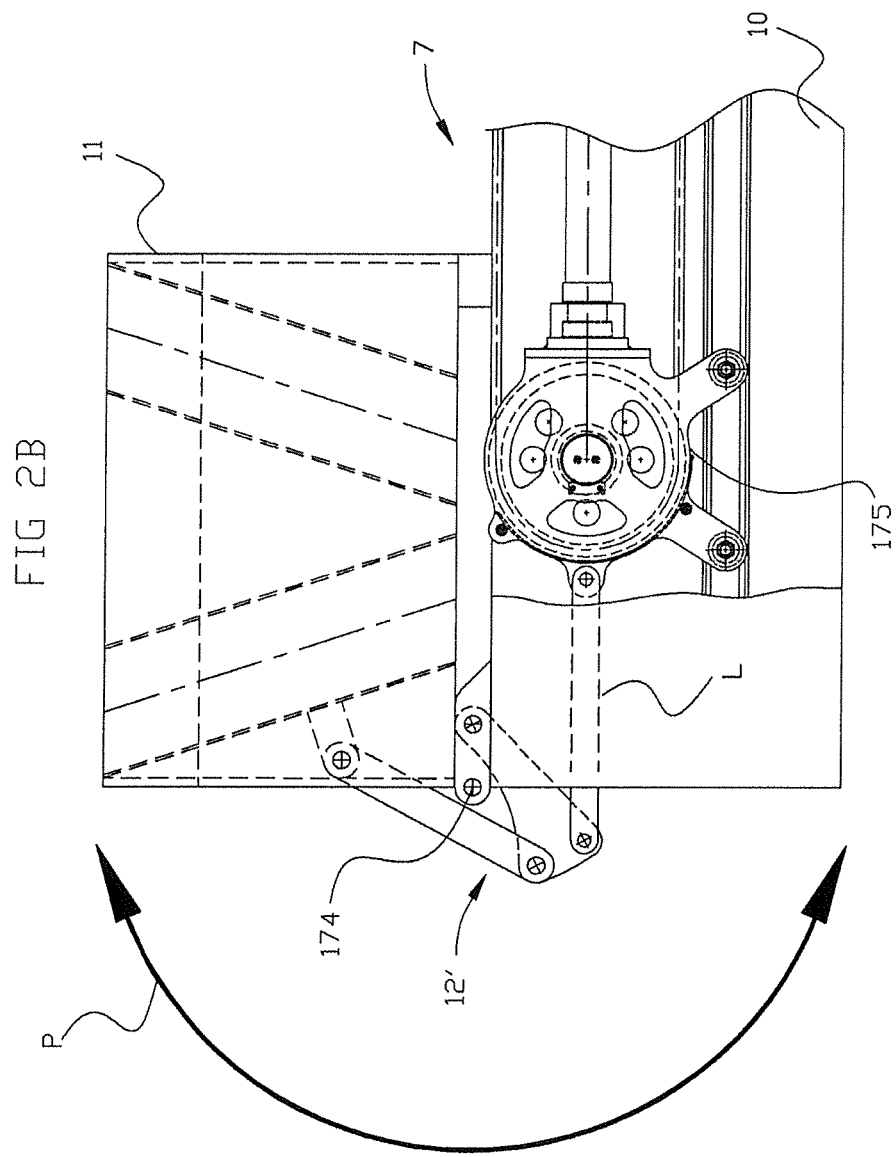

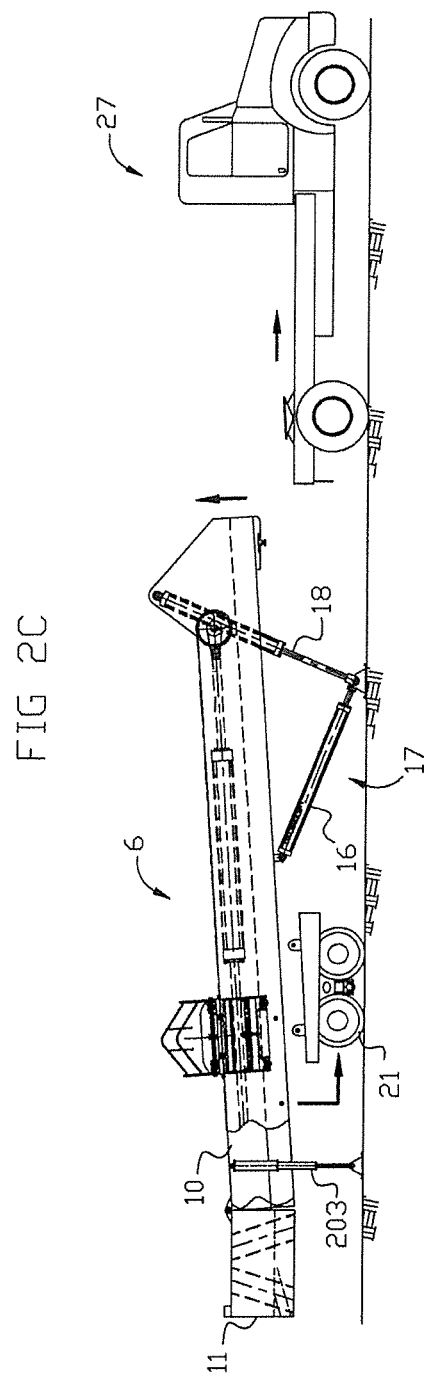

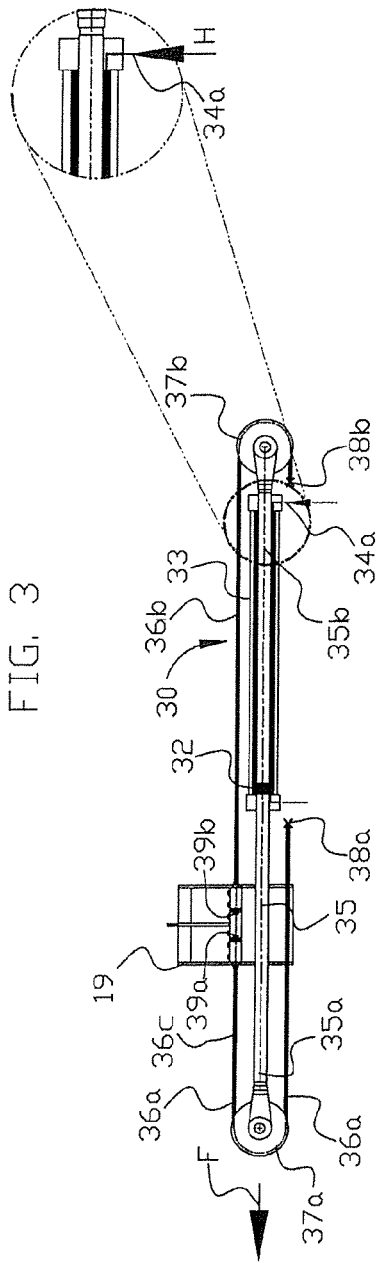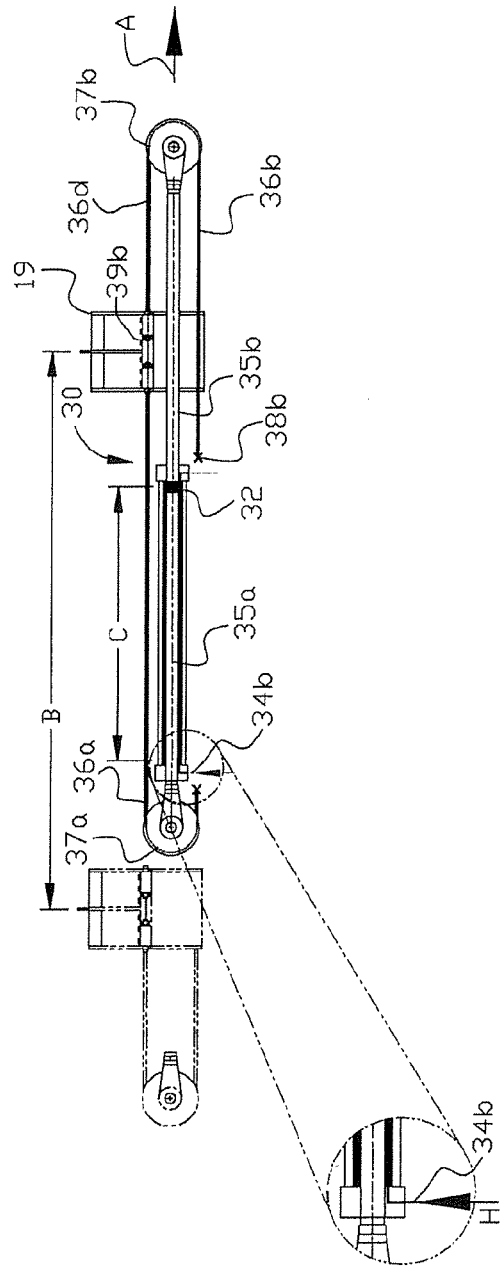

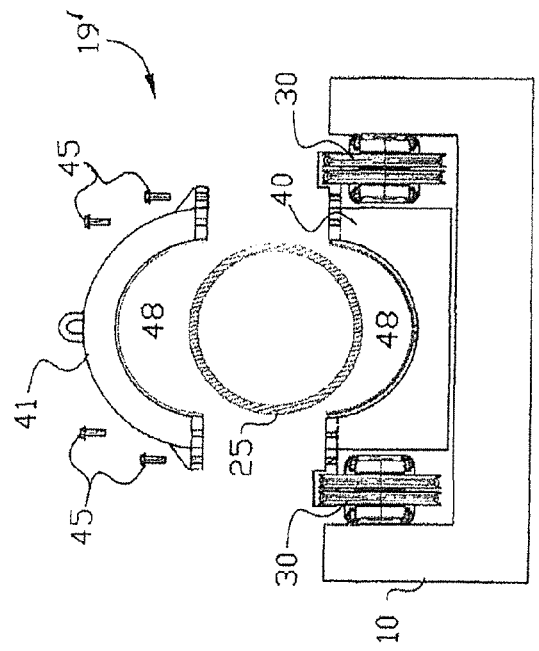
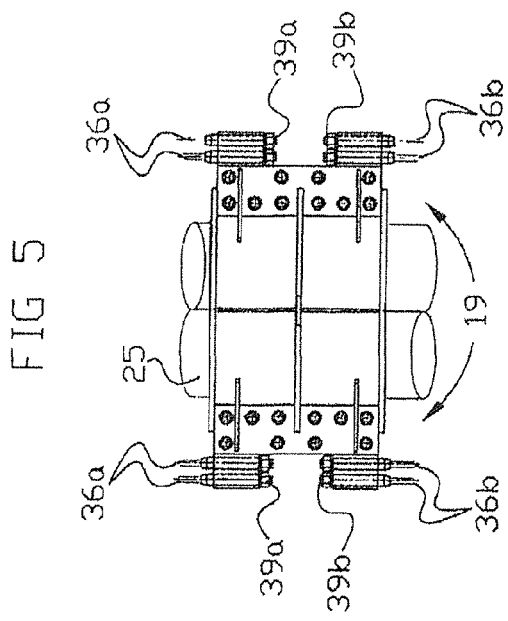
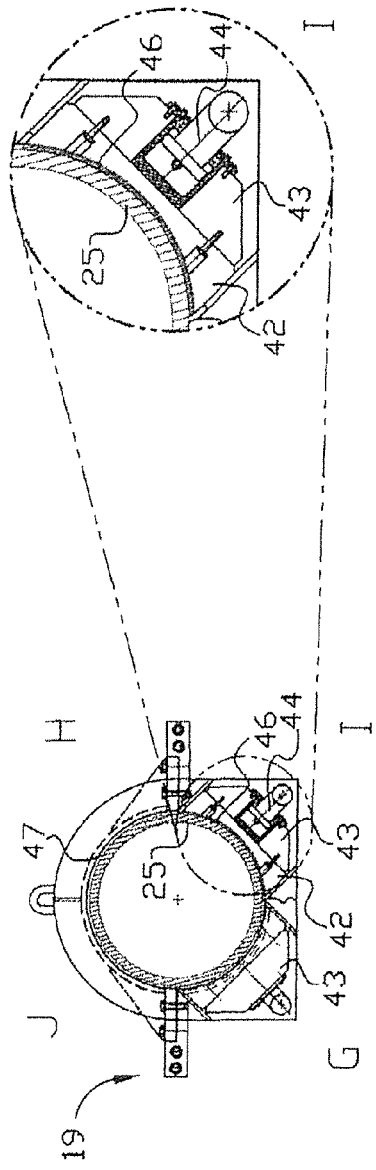

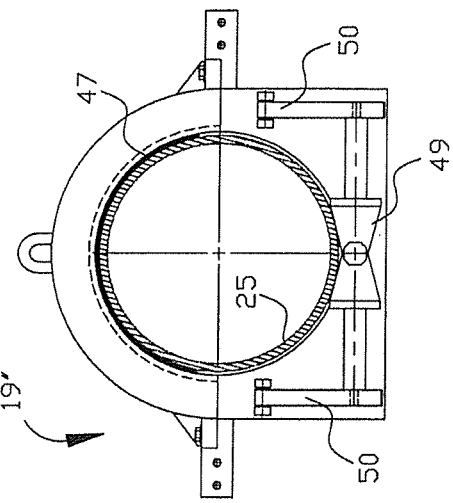
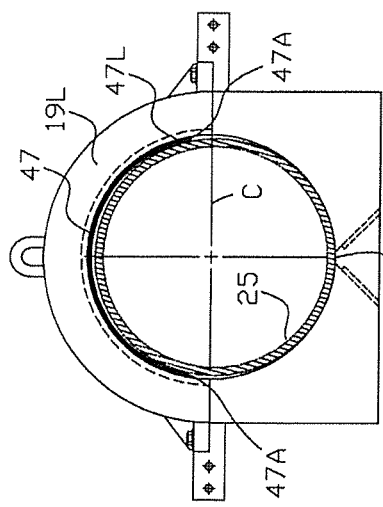
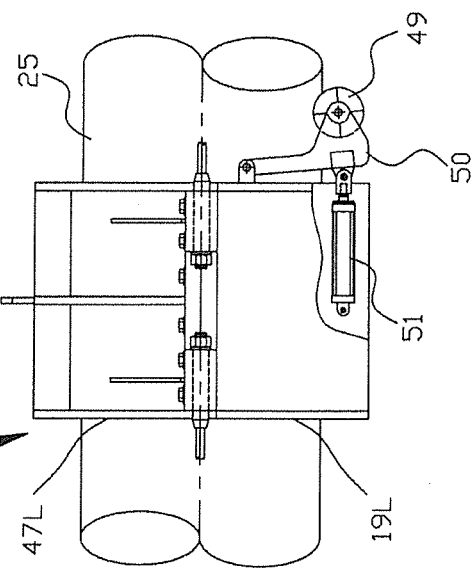

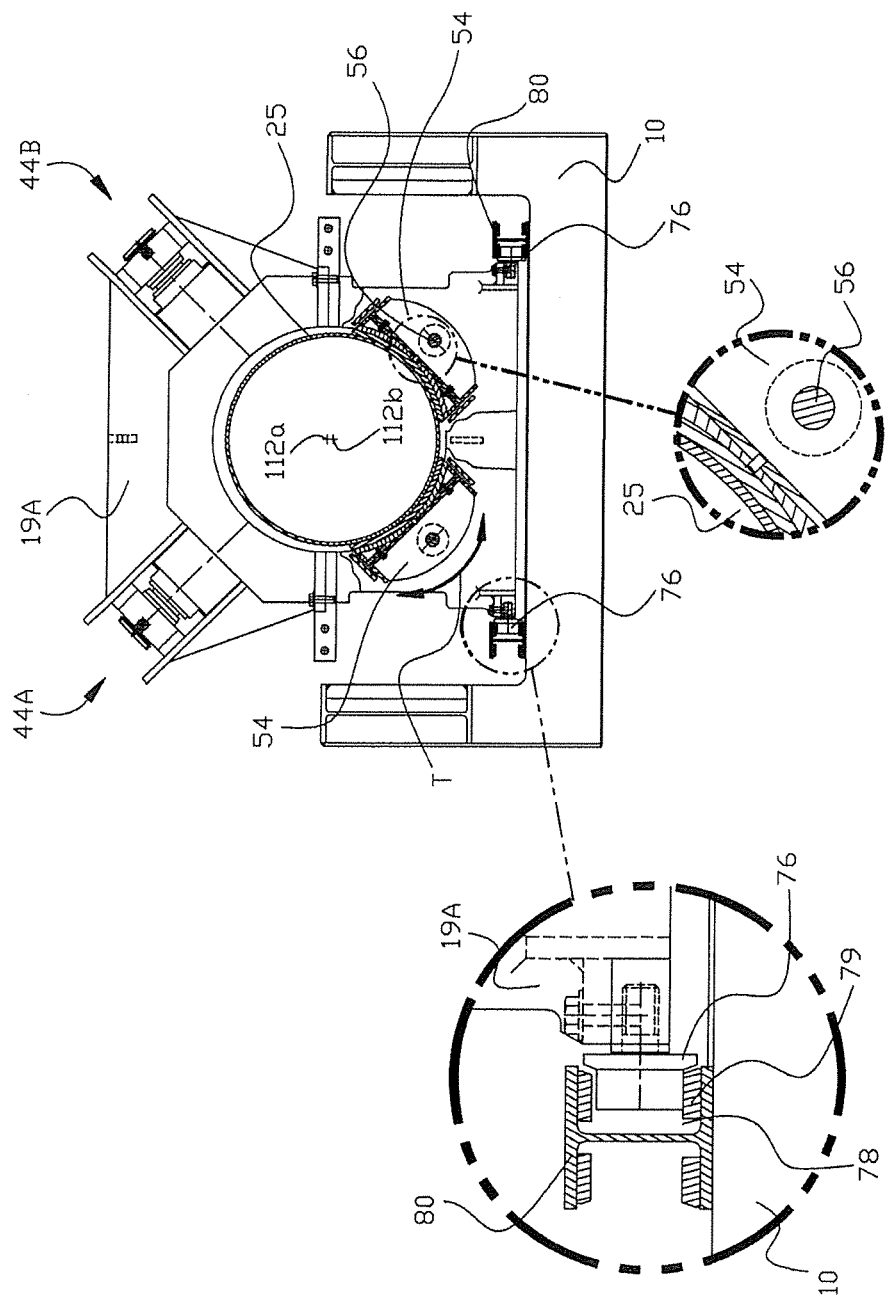

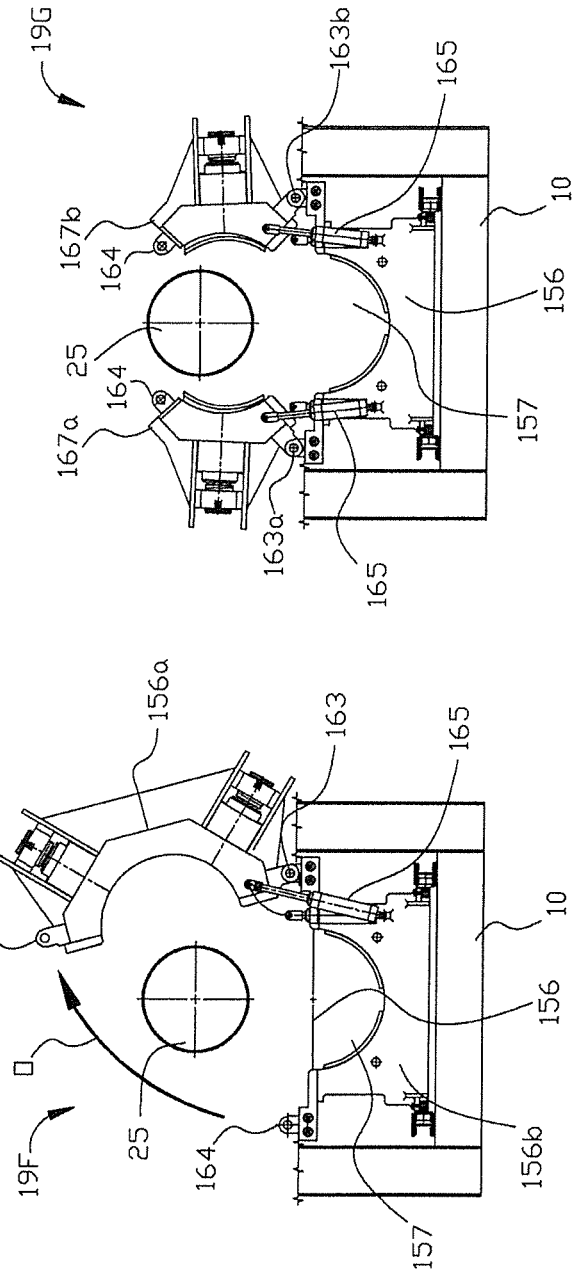

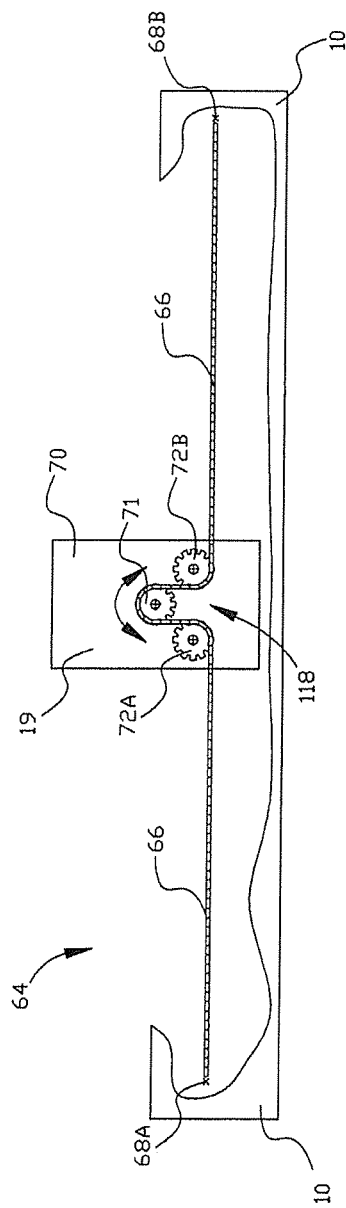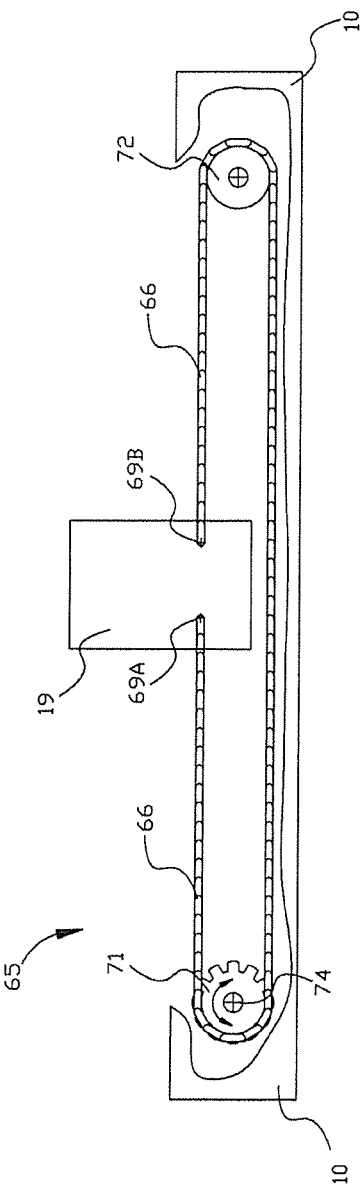

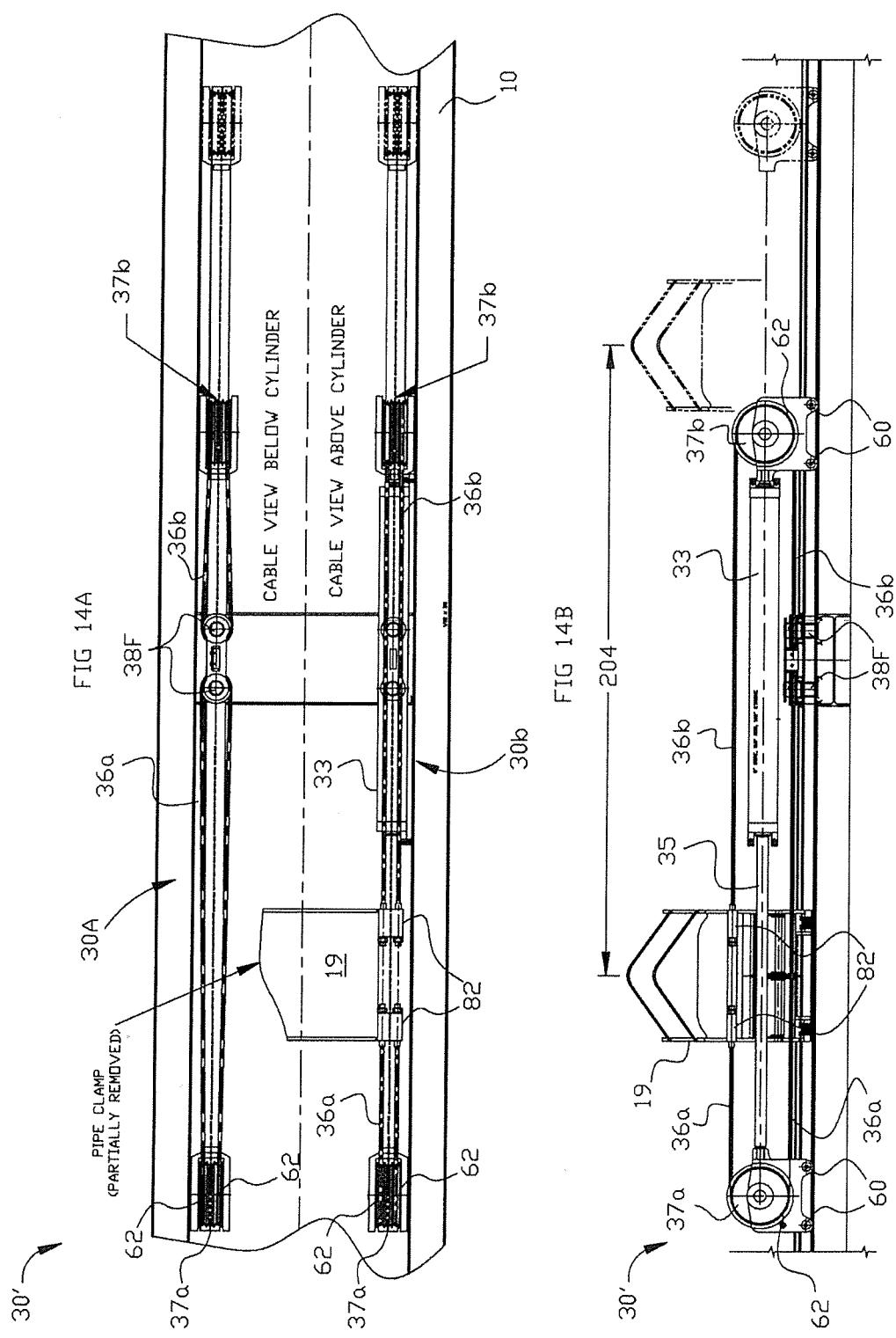

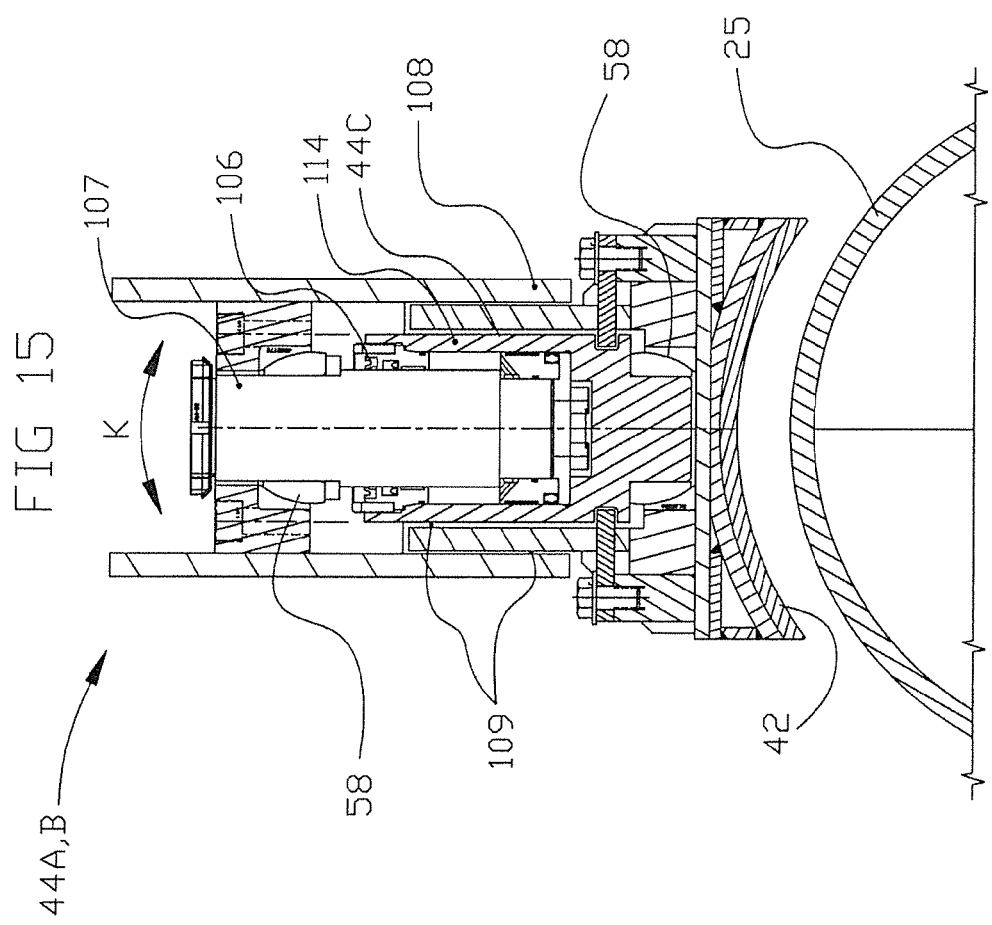

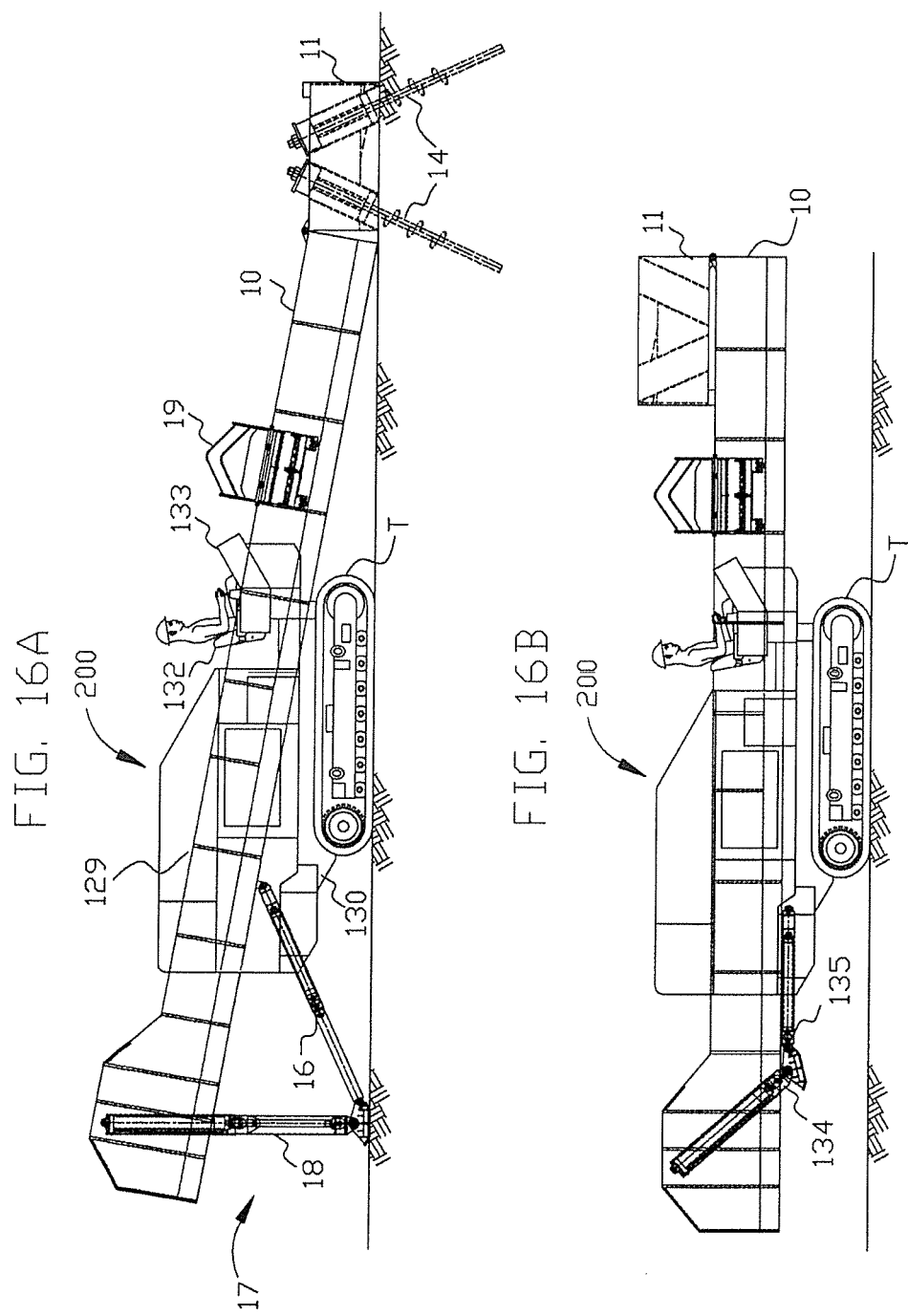

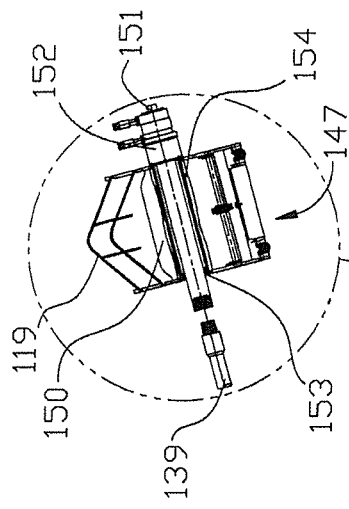
FIG. 17C
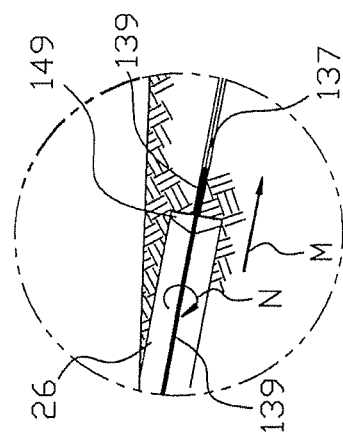
FIG. 17B
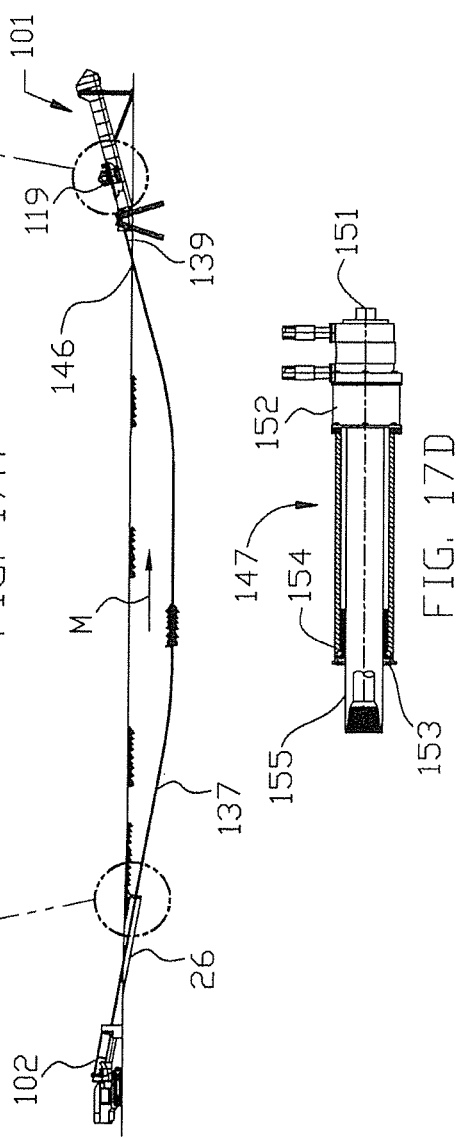
FIG. 17A
FIG. 17D

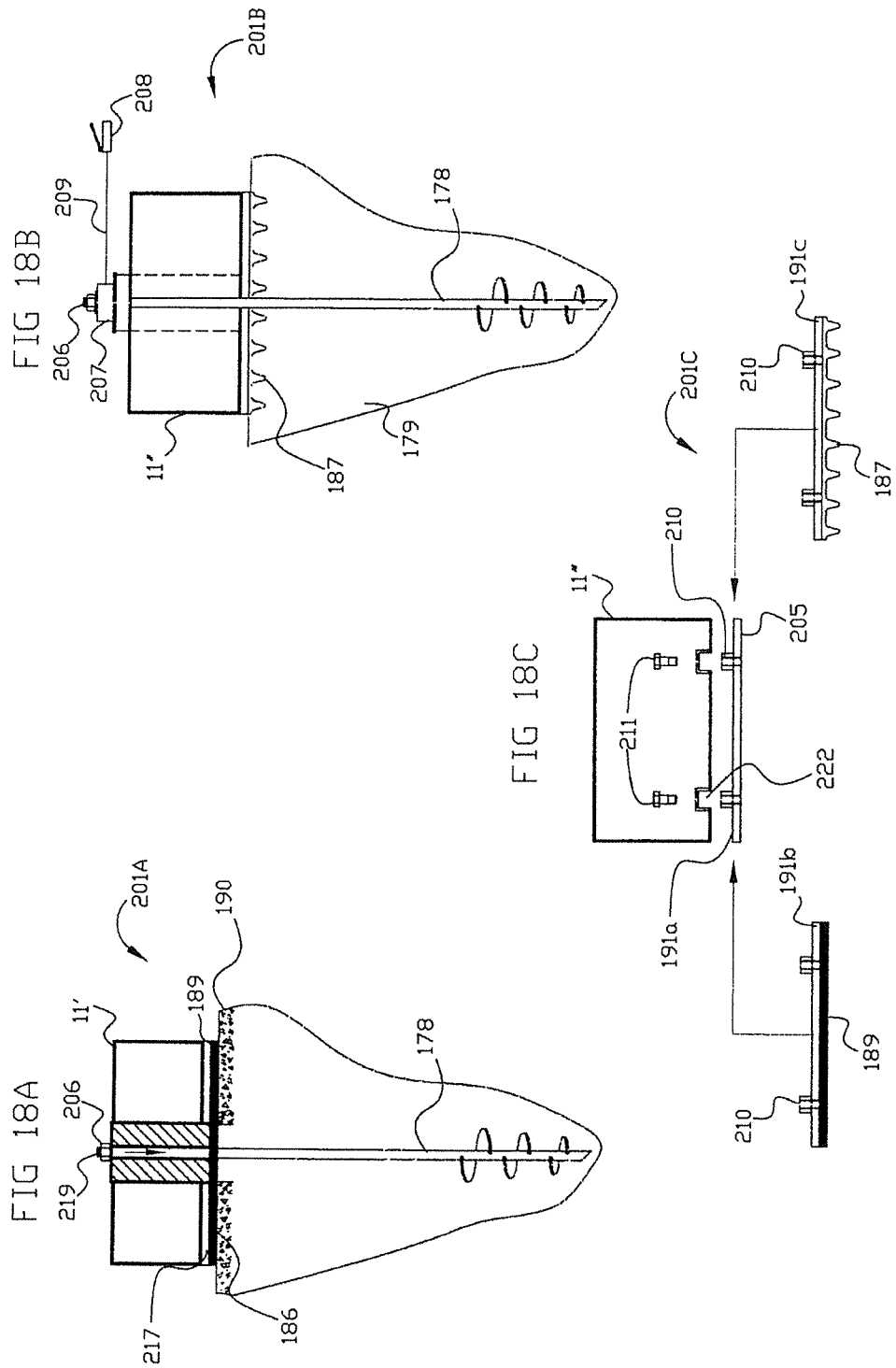

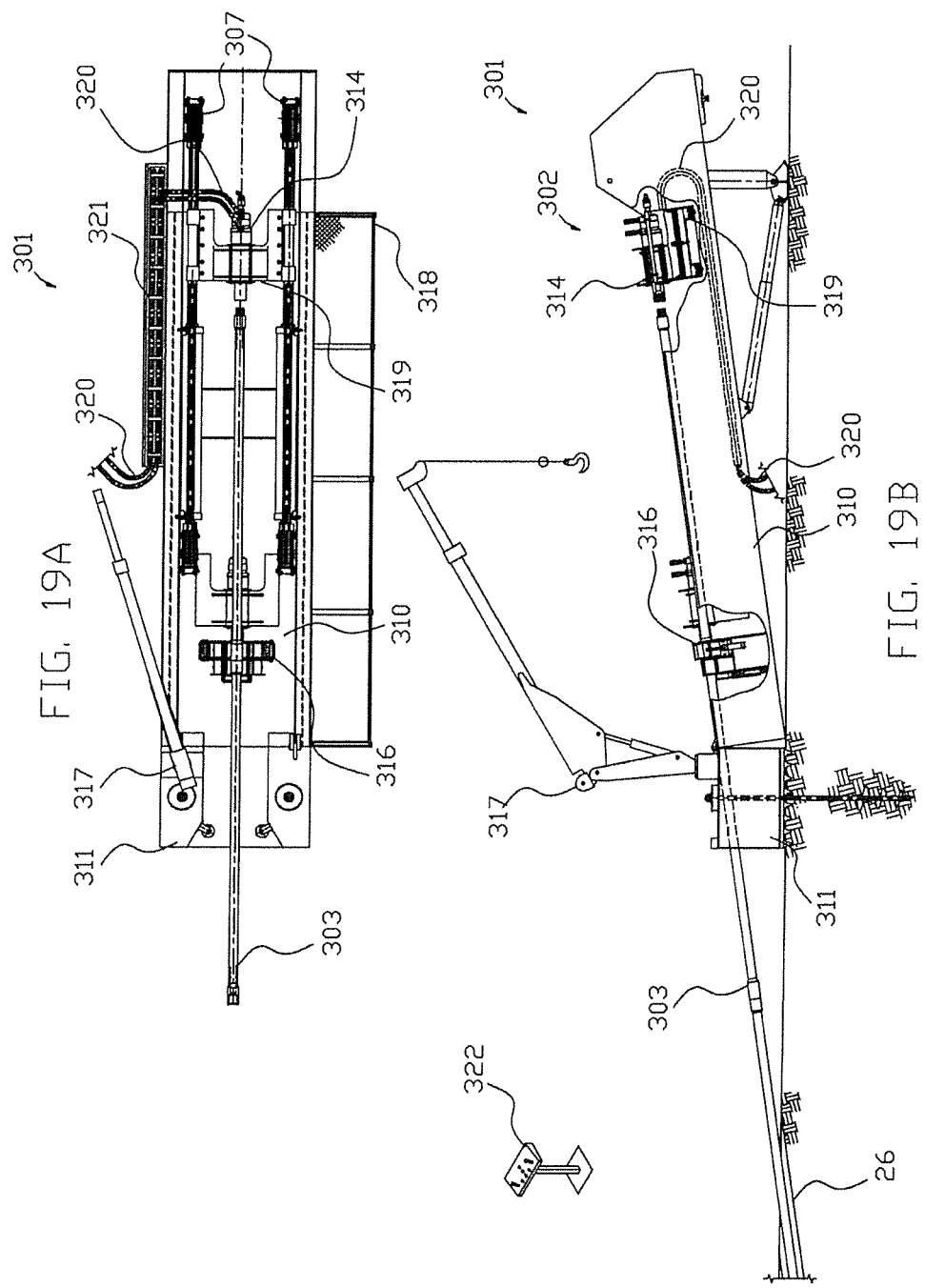

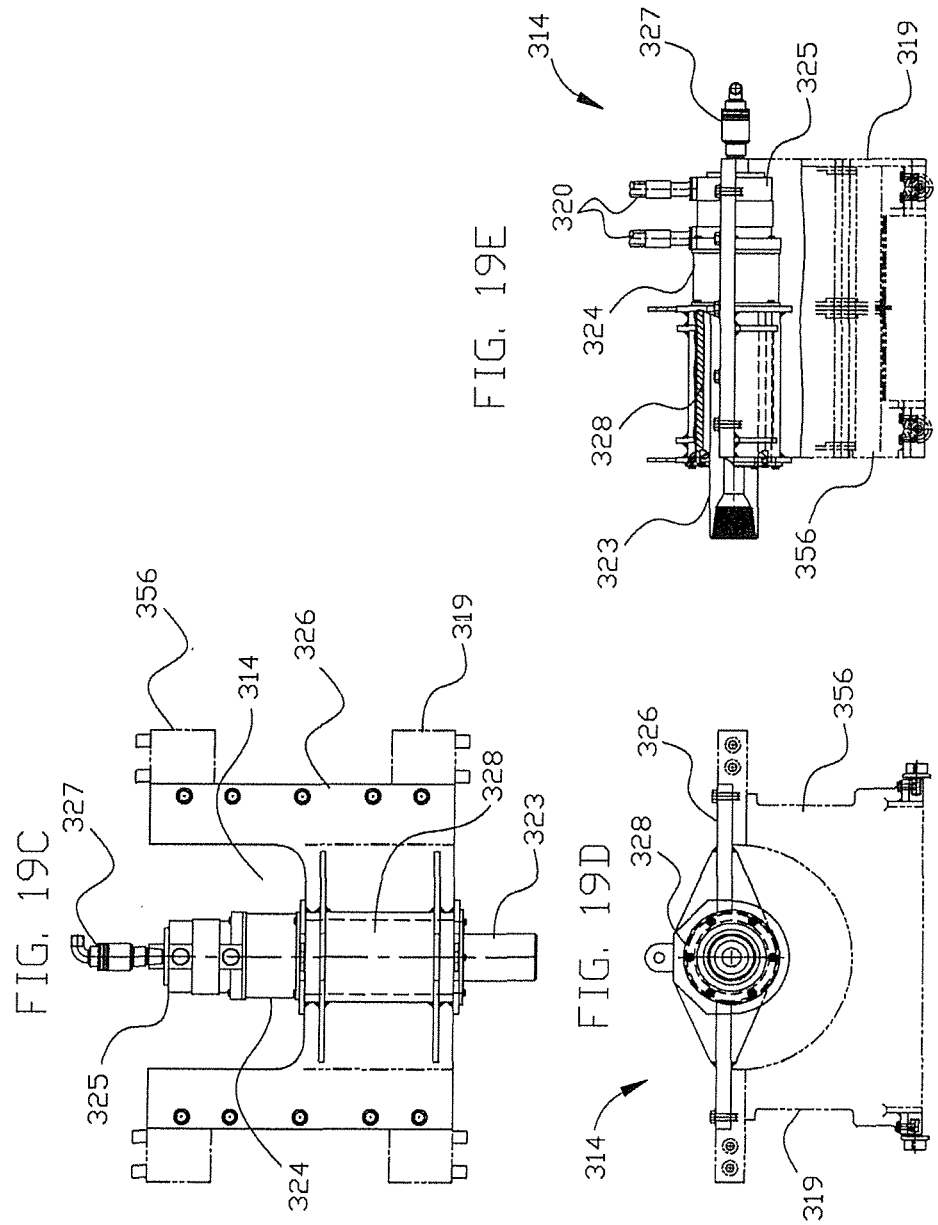

METHOD AND PORTABLE APPARATUS FOR FORCING A PIPELINE INTO OR OUT OF A BOREHOLE

CROSS-REFERENCE

This application claims priority to and the benefit of U.S. Provisional Application No. 61/513,433, filed Jul. 29, 2011, and U.S. Provisional Application No. 61/619,180, filed Apr. 2, 2012, the entire contents of which are incorporated herein by reference.

FIELD OF THE INVENTION

This invention relates to horizontal directional drilling under the broad field of trenchless technology. More particularly, it relates to an apparatus and an associated method to thrust a pipeline into a borehole or to withdraw a pipeline from a borehole.

BACKGROUND

Trenchless installation techniques are known for underground placement of transmission lines, such as for oil and gas products, electrical power, and telecommunications, or utility or distribution pipelines, such as for water, sewer, electrical power, natural gas, or co-axial cables for television, data, and telephone. These utility or distribution pipelines are typically found in urban areas. The underground placement of larger transmission lines such as water, oil, gas, and electrical power are often located between cities, linking city to city. One method of trenchless installation is referred to as "horizontal directional drilling", a method preferred for placing pipelines under obstacles such as streets, property easements, canals, rivers or ocean shore approaches. Variations of this method are disclosed and taught by my prior patents, entitled "Drilling Method and Apparatus for Large Diameter Pipe", U.S. Pat. No. 4,221,503; and "Method and Apparatus for Thrusting a Pipeline into Bore Hole", U.S. Pat. No. 5,375,945.

A known method of horizontal directional drilling, for both distribution and transmission pipelines, includes drilling a borehole with a drilling rig and drilling pipe string, and then pulling a pipeline back through the borehole. The borehole extends in the desired path for the pipeline, such as under a street or river. After the borehole has been drilled by the drill string, the front end of the pipeline is attached to the drill string so that the pipeline is pulled into the borehole as the drill string is removed. When installing a transmission pipeline, the drilling rig located at the first end of the borehole (the borehole entry) may be used to withdraw the drill string from the borehole, and in addition, a pipe thruster located at the second end of the borehole (the borehole exit) may be used to push the pipeline into the borehole. If the pipeline is small and short enough, the drilling rig alone may be used to withdraw the drill string and pull the pipeline into the borehole, or the pipe thruster alone may be used to push the pipeline into the borehole. For larger or longer pipes, the drilling rig and the pipe thruster work together to install the pipeline into the borehole.

Various known pipe thrusters and associated methods for placing pipelines into boreholes have encountered shortcomings that limit their effectiveness and performance. As an example, there have been difficulties in arranging a pipe thruster that can easily and quickly reverse direction, to withdraw a pipeline from a borehole if necessary. This may be useful, for example, if the pipeline gets stuck in the borehole or becomes damaged, or if the borehole needs reconditioning. Existing pipe thrusters may need to be partially disassembled and reconfigured to move in reverse, and/or may operate more slowly in reverse. This has proven to be time consuming and costly, and the inability to quickly withdraw the pipeline from the borehole raises the risk of the pipeline becoming stuck. To date, existing pipe thrusters have failed to meet the criteria associated with horizontal directional drilling in the utility industry, such as providing a single unit pipe thruster that is relatively small and lightweight and that can be legally transported over the highway, and then installed within confined work spaces.

Another example is the difficulty of coordinating the movement of the pipe thruster on one end and the drilling rig on the other end. Some pipe thrusters operate through a shorter travel range than the drilling rig, and as a result the drilling rig must pause mid-stroke to wait for the pipe thruster to reset. When hydraulic cylinders are used to thrust the pipeline, short hydraulic cylinders may have to be repeatedly extended and retracted, slowing down the overall operation, while longer hydraulic cylinders may be subject to torsion and damage from pipeline roll.

In addition, existing pipe thrusters can be very expensive and bulky, and difficult to assemble and disassemble. Accordingly a need exists for an improved pipe thruster that is easier to operate, with a more portable design.

SUMMARY

In accordance with the present invention, a method and apparatus are provided for thrusting a pipeline into a borehole, to address many of the problems encountered by prior systems. In one embodiment, a portable pipe thrusting apparatus for inserting and removing a pipe from a borehole includes a collar configured to releasably grip the pipe, a support frame, and a bi-directional driver. The support frame includes a front anchor and a central frame, and the front anchor is securable to the ground between the central frame and the borehole. The bi-directional driver is coupled between the collar and the support frame, and is configured to drive the collar toward and away from the borehole, to insert and remove the pipe from the borehole. The support frame is portable and is singularly transportable by a truck to the drilling site.

In one embodiment, a horizontal directional drilling system includes a drilling rig coupled to a drill string for drilling a borehole. The drilling rig is positioned at an entry of the borehole. The drilling system also includes a pipeline coupled to the drill string for insertion into the borehole, and a pipe thrusting apparatus as described in the preceding paragraph. The pipe thrusting apparatus is positioned at an exit of the borehole and engages the pipeline to insert the pipeline into the borehole.

BRIEF DESCRIPTION OF THE DRAWINGS

FIG. 1 is a side elevational view of a portable pipe thruster according to an embodiment of the invention, in a deployed position.

FIG. 1A is an enlarged view of a front anchor for a portable pipe thruster, according to an embodiment of the invention.

FIG. 1B is an enlarged side view of a rear leg assembly and foot structure of a pipe thruster, according to an embodiment of the invention.

FIG. 2A is a side elevational view of the pipe thruster of FIG. 1, in a stowed, transportable position.

FIG. 2B shows an enlarged view of a front anchor for a portable pipe thruster, in a stowed position, according to an embodiment of the invention.

FIG. 2C shows a portable pipe thruster during the process of deployment, according to an embodiment of the invention.

FIGS. 3 and 4 are side elevational views of a double-ended hydraulic cylinder for use with a pipe thruster according to an embodiment of the invention, in first and second positions.

FIG. 5 is a top view of a collar engaging a pipeline, for use with a pipe thruster according to an embodiment of the invention.

FIG. 6 is an end view of the collar of FIG. 5.

FIG. 7 is an end view of a collar according to another embodiment of the invention.

FIG. 9 is a front view of a collar with the pipeline in a lowered position (with the pipeline shown in cross-section).

FIG. 10 is a cross-sectional view of a collar having a roller mechanism according to an embodiment of the invention.

FIG. 11A is a side view of the collar of FIG. 10.

FIG. 13A is a schematic side view of a chain drive system for a pipe thruster, according to an embodiment of the invention.

FIG. 13B is a schematic side view of a chain drive system for a pipe thruster, according to an embodiment of the invention.

FIG. 14A is a cut-away top view of a cable drive system for a pipe thruster, according to an embodiment of the invention.

FIG. 14B is a side view of the cable drive system of FIG. 14A.

FIG. 15 is an enlarged view of a bearing utilized in a collar for a pipe thruster, according to an embodiment of the invention.

FIG. 16A is a side view of a pipe thruster mounted on tracks, in an operating position according to an embodiment of the invention.

FIG. 16B is a side view of the pipe thruster of FIG. 16A, in a transport position.

FIG. 17A is a side view of a drilling system including a drilling machine and a pipe thruster in a reaming operation, according to an embodiment of the invention.

FIG. 17B is an enlarged view of a reaming device of the system shown in FIG. 17A.

FIG. 17C is an enlarged view of a collar of the pipe thruster shown in FIG. 17A.

FIG. 17D is an enlarged view of an auxiliary rotary drive attachment for the pipe thruster shown in FIG. 17A.

FIG. 18A is a cross-sectional view of a front anchor with a securement mechanism according to an embodiment of the invention.

FIG. 18B is a cross-sectional view of a front anchor with a securement mechanism according to an embodiment of the invention.

FIG. 18C is a schematic view of a front anchor with a securement mechanism according to an embodiment of the invention.

FIG. 19A shows a top view of a pipe thruster with a drilling attachment, according to an embodiment of the invention.

FIG. 19B shows a side view of the pipe thruster of FIG. 19A.

FIGS. 19C, 19E, and 19D show top, front, and side views, respectively, of the collar and drill head of the pipe thruster of FIG. 19A.

DETAILED DESCRIPTION

The present invention relates to horizontal directional drilling, and more particularly, to an apparatus and an associated method to thrust a pipeline into a borehole or to withdraw a pipeline from a borehole. In one embodiment, a pipe thrusting apparatus includes a collar that grips and releases the pipe, a bi-directional driver for moving the collar toward and away from the borehole, and a support frame against which the driver acts to move the collar and the pipe. The bi-directional driver, such as a hydraulic cylinder and cable system, drives the collar toward or away from the borehole, to either insert the pipeline into the borehole or withdraw it from the borehole. The driver can drive the pipeline in either direction—forward into the borehole or in reverse, out of the borehole—without being disassembled and reconfigured. That is, the driver can operate in both directions. The support frame is anchored into the ground to react against the force applied by the driver. The support frame is portable, and can be transported by a truck to the drilling site. In one embodiment, the support frame is incorporated into a single portable trailer whose frame acts as the support frame in accordance with the invention. In one embodiment, the pipe thruster is suitable for moving pipelines of about 30 inches or smaller. In other embodiments, larger or smaller pipelines may be used.

Figure 8:
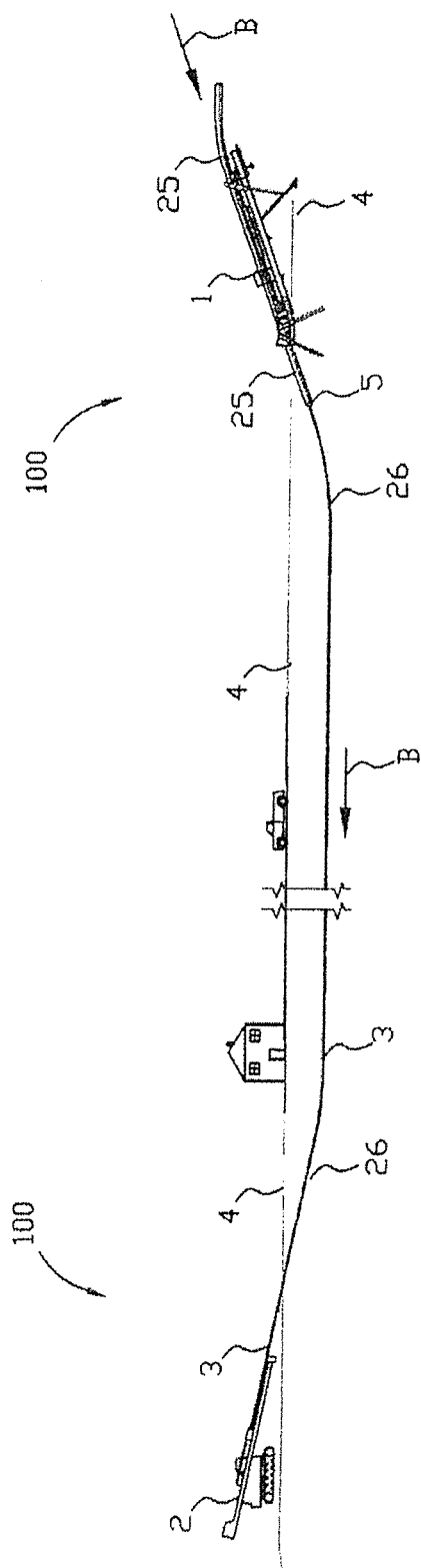
FIG. 8 is an elevational view of a horizontal drilling system including a pipe thruster, borehole, and drilling rig.

FIG. 8 shows a horizontal drilling system 100 according to an embodiment of the invention. The drilling system 100 includes a drilling rig 2 and a pipe thruster 1 that are coordinated together to insert a pipeline 25 into a borehole 26. First, the drilling rig 2 drills the borehole 26 with the drill string 3. The borehole 26 is drilled in the desired path, such as below a street 4 or body of water. Once the borehole has been formed, the drilling rig 2 is operated in reverse to withdraw the drill string 3 from the borehole. The pipeline 25 is attached to the leading end of the drill string 3 via a pulling head 5. In one embodiment, the pulling head 5 incorporates a swivel that enables the drill string 3 to rotate freely without twisting the pipeline 25. The drilling rig 2 and the pipe thruster 1 work in unison, at the entry and exit points of the borehole, to remove the drill string 3 and insert the pipeline 25, in the direction of arrow B. The system can also work in reverse, to remove the pipeline from the borehole if necessary. Drilling fluid may be pumped into the borehole to keep it lubricated and to prevent the pipeline from sticking. The pipeline is normally not rotated while it is moved into or out of the borehole, as twisting of the pipeline may be undesirable. Thus the drilling fluid reduces the friction along the borehole as the pipeline is moved.

A pipe thruster 1 according to an embodiment of the invention is shown in more detail in FIGS. 1-2. The pipe thruster 1 includes a reactionary support frame 6, a bi-directional driver 7, and a collar 19 that grips the pipeline 25 to move it into or out of the borehole 26. The support frame 6 includes a front anchor 11 connected to a central frame 10. In one embodiment, the central frame 10 is incorporated into a trailer, so that it is easily transportable by a truck to the drilling site. The pipe thruster 1 is suited for thrusting or retracting pipelines of 30 inches in diameter or less, which may be useful for the utility pipeline industry, or in another embodiment, about 30-40 inches in diameter, such as about 36-40 inches in diameter.

As shown in FIG. 1, the support frame 6 includes the central frame 10 and the front anchor 11. The front anchor 11 is positioned between the central frame 10 and the borehole 26. The front anchor is secured to the ground 31 by piles 15 and/or soil screws 14, which are driven downwardly into the ground below the anchor. Two or more piles may be used to secure the anchor to the ground, or two or more soil screws, or combinations of each. In one embodiment, a single well includes a combination of both a soil screw (or tension tube) and a piling, as shown in FIG. 1A. In FIG. 1A, the front anchor 11 includes sleeves or channels 11A for the piles 15. The piles 15 extend through the sleeves 11A into the ground. The piles 15 include a hollow central bore, enabling a soil screw, tension anchor, or tension tube to pass through the pile and extend further into the ground. For example, where the ground includes dirt or soil 179, a soil screw or helical tension anchor 178A extends from the pile 15. Where the ground includes a rock formation 193, the rock formation is drilled to enable a tension tube 178B to extend from the pile 15 into the rock. The annular space between the tension tube 178B and the walls of the drilled rock formation may be filled with cement (as indicated in FIG. 1A) to further secure the tube to the ground. In embodiments of the invention, various combinations of piles, soil screws, tension anchors, and tension tubes may be used. Thus, as shown in FIGS. 1 and 1A, the anchor 11 is firmly secured to the ground 31, so that the anchor 11 can react against the forces applied to the support frame 6 by the driver 7, in moving the pipe forward or backward, as described further below. The force applied by the driver 7 against the support frame 6 is passed to the front anchor 11 through the hinge connections 12—one on each side of the anchor (only one shown in FIG. 1).

In one embodiment, the tension anchors 14 include a shaft portion and one or more helical bearing plates connected to the shaft portion for engaging the ground. The shaft portion of the tension anchors may have any suitable shape, such as square, rectangular, or tubular. The helical bearing plates may include split circular plates connected to the shaft. In one embodiment, the helical bearing plates extend circumferentially around the shaft and have split ends longitudinally spaced apart along the shaft (see FIG. 1A). FIG. 1A depicts a tension anchor 14 having three helical bearing plates. However, it will be appreciated that the tension anchors 14 may include any suitable number of helical bearing plates. The helical bearing plates are configured to secure the pipe thruster to the ground by increasing the shear forces on the tension anchors. More specifically, the helical bearing plates are configured to secure the pipe thruster to the ground by increasing the "plug" (i.e., the vertical column of soil above the helical bearing plates) that must be displaced to move the pipe thruster, as compared to conventional threaded ground screws.

The central frame 10 is positioned behind the front anchor 11. The central frame 10 supports the bi-directional driver 7 and reacts against the forces applied by the driver. Furthermore, the central frame 10 supports and aligns the pipeline 25 as it moves into or out of the borehole. A pair of rollers 23 (one shown in FIG. 1) are mounted on the frame 10 and support the pipeline 25 as it passes over the rollers 23. Another pair of rollers 24 may be provided on the front anchor 11 to support and guide the pipe toward or away from the borehole. The pipe rollers 23 and 24 may be adjusted manually or automatically. When automated, the pipe rollers 23, 24 may be controlled remotely to position the pipeline with respect to the frame 10 and/or the borehole 26. The rollers 23, 24 may also be self-adjusting, such as by spring-loading the rollers 23, 24 to urge against the pipeline to lift the pipeline into the desired position. The rollers 23, 24 may be powered by hydraulic cylinders, air bladders, or other actuators.

The central frame 10 is adjustable in height and angle so that it can be aligned with the angle of the borehole 26. For a steeper borehole, the frame can be raised, and for a more shallow borehole, the frame can be lowered. In one embodiment, the angle between the ground and the lifted frame 10 is between about 5-15 degrees. The height and angle of the central frame 10 are adjusted by a rear leg assembly 17. The rear leg assembly includes two independent structural steel support legs 16 (one on each side, only one shown in FIG. 1) that are hinged below the central frame 10. The legs 16 include telescoping extension members 16B (one shown in FIG. 1) that are extendable to the desired length and secured with a pin. The two independent support legs 16 are used to position two hydraulic cylinders 18 (one shown in FIG. 1), to locate and maintain the frame at the desired angle and to keep the frame structurally true and aligned. The support legs 16 and/or extension members 16B may be firmly secured to the ground 31 by pins or other suitable anchors. The hydraulic cylinder 18 is connected between each leg 16 and the frame 10 to support the frame elevated above the legs. In another embodiment, the rear leg assembly 17 includes a pair of extendable legs, one on each side of the frame, which include a hydraulic cylinder that extends or retracts a strut to raise or lower the frame.

In one embodiment, the rear leg assembly 17 includes a footing structure 77. The footing structure includes a foot 77A that rests on the ground 31. In one embodiment, the foot 77A extends across the width of the thruster, connecting to both rear legs 17 on each side of the thruster. A pin 77B or spherical bearing connects the foot to each rear leg assembly 17. The foot 77A can rotate about this pin or bearing to adjust to uneven terrain along the ground 31. The independent positioning of the two legs 16 (one on each side of the frame) about the pin/bearing allows the foot 77A to conform to the ground, while maintaining the alignment of the thrusting frame 6.

In one embodiment, as shown in FIG. 1B, the legs 16, 18 each include a reinforcing sleeve 182 enclosing the telescoping extension members 16B, 18B to protect the cylinder from lateral forces. The ends of the reinforcing sleeve 182 are connected to the footing structure 77'. In this embodiment, the footing structure 77' includes two pins 77C, 77D that connect to the extension members 16B, 18B, respectively. In FIG. 1B, the legs are shown in the extended position 128a and the retracted position 128b.

The central frame 10 is attached to the front anchor 11, so that the load applied by the driver 7 can be passed through the central frame 10 to the front anchor 11. In order to enable the central frame to be adjustable in height and angle, the connection between the central frame 10 and the front anchor 11 is also adjustable. In one embodiment, the central frame 10 is attached to the anchor 11 by a hinge connection 12 and a hydraulic cylinder 13. The cylinder can be extended or retracted, and the hinge can be pivoted, to allow for adjustment of the orientation of the central frame 10 with respect to the anchor 11.

The support frame 6 includes the front anchor 11 and the central frame 10. This support frame 6 is a rigid frame that is securely fixed to the ground, both to support the pipeline 25 as it passes into or out of the borehole, and to react against the driver 7. The front anchor 11 is the main reactionary structure, which is firmly secured to the ground to react against the forces applied to the frame 6. As shown in FIGS. 1 and 1A, the piles 15 and/or soil screws 14 are passed through the anchor 11 and driven far into the ground below. These piles/screws pass through corresponding slots or guides in the anchor 11 to rigidly mount the anchor to the ground. To move the collar and the pipeline, the driver 7 bears against the central frame 10, and the central frame 10 transmits this load to the front anchor 11. The anchor 11 provides a firm reactionary support against this driving force. The anchor also supports and guides the pipe toward or away from the borehole, over the rollers 24. In another embodiment, the rollers 24 are provided in the central frame 10 rather than the front anchor 11. The anchor 11 may include a passage or cavity for receiving the pipe, as indicated by FIG. 1.

The central frame 10 itself also has two functions. The central frame 10 cooperates with the front anchor to react against the driver 7 during insertion and retraction of the pipe. That is, the first function of the central frame is to provide a load path to transmit force from the driver to the front anchor. The central frame also provides a second function, elevating and supporting the pipeline 25 and aligning it with the front anchor 11 and the borehole 26.

Thus, according to embodiments of the invention, the support member for supporting the pipeline and the reactionary member for pipeline insertion and retraction are incorporated into the same structure, the support frame 6. The support frame 6 vertically and laterally supports the pipe to align it with the borehole, and also reacts against the force applied by the driver to move the pipe into or out of the borehole. This design provides a compact and robust structure.

As shown in FIG. 2A, the pipe thruster 1 is portable so that it can be easily transported to the drilling site. In the embodiment shown, the support frame 6 is incorporated into a trailer 8 that can be towed by a truck 27. In one embodiment, the central frame 10 itself is the trailer 8. That is, the same structure 10 acts as the support frame and the transportable trailer. This frame 10 provides support for the pipeline and the driver, and can be directly attached to a truck as a trailer 8, for towing. Referring to both FIGS. 1 and 2A, the trailer 8 includes an axle and wheel assembly 21 that are attached to the trailer during transport, and that are removable from the trailer during pipe thrusting operations. The axle and wheels may be attached to the trailer by sliding or coupling the wheels onto mating connectors 20 on the trailer. The frame includes a trailer hitch 28 and vertically adjustable landing jacks 29. In one embodiment, shown in FIG. 2C, the frame also includes a front hydraulic support leg 203 which may be used to lift the frame 6 for connection and disconnection of the axle and wheel assembly 21.

The pipe thruster also includes a portable power and control module 22, which can be carried by the truck 27 and installed at the drill site. The power and control module 22 supplies hydraulic energy and control circuits by way of hoses and control wires (not shown) to the hydraulically working components on the support frame 10. In FIG. 1, the module 22 is shown as a separate module that can be positioned away from the pipe thruster frame 6, depending on the particular drilling installation and the local terrain. In another embodiment, the power and control module 22 is integrated into the frame 6, forming one integrated structure, rather than being a separate unit. For example, the power and control module 22 may be incorporated into the rear end of the central frame 10, above the landing jack 29. Additionally, the power source and the controller may be provided in separate locations on the frame 6. In one embodiment, power for the pipe thruster is drawn from the truck 27. In particular, the engine from the truck 27 can be used to power the pipe thruster, either in addition to or instead of the power module 22. The same truck 27 can thus be used to power, transport, and tow the pipe thruster. A controller may be incorporated at a different location, either on the truck 27 or the frame 6.

For transportation, the front anchor 11 may be rotated about the hinge 12 into a storage position at the rear of the central frame 10/trailer 8, the power module 22 is placed on the trailer 8, and the legs 16 are lifted. The rotation of the front anchor 11 about a hinge 12', according to an embodiment, is shown in FIG. 2B. The front anchor 11 is connected to the central frame 10 by the hinge 12'. The front anchor 11 is rotated in the direction of arrow P about the frame 10. The hinge 12' includes pins 174 and linkages that enable the front anchor 11 to pivot in the direction of arrow P to rest in a stowed position on the top of the frame 10. The rotation of the anchor 11 into this stowed position may be assisted by hydraulic cylinders or even by the driver itself, through linkage L, as shown in FIG. 2B.

The trailer 8 is road- and highway-transportable by the truck 27. The truck may be a common medium-duty truck, which is used to tow the frame 6, driver 7, collar 19, and related equipment such as the power unit 22. In one embodiment, the overall dimensions and weight of the pipe thruster 1 shown in FIGS. 1 and 2 are small enough to enable the pipe thruster 1 to be transported within a standard sea container for ocean transport. For example, in one embodiment, the length of the pipe thruster in its stowed configuration (FIG. 2A) is about 40 feet or less.

In another embodiment, the central frame 10 takes the form of a skid-mount, rather than a trailer. That is, the central frame 10 is itself a skid mount, which can be lifted and placed onto a trailer for easy transportation to the drilling site. In another embodiment, the central frame 10 and the power and control module 22 are mounted on tracks for moving the frame onto and off of an equipment trailer, and to more easily maneuver and operate the pipe thruster in remote or difficult ground surface conditions. A pipe thruster 200 mounted on tracks is shown in FIGS. 16A and 16B, according to an embodiment of the invention. The pipe thruster 200 includes a front anchor 11 and a central frame 10. The central frame 10 is mounted on a track frame 130 which includes tracks T. FIG. 16A shows the pipe thruster in an operating position, with soil screws or earth anchors 14 securing the front anchor 11 to the ground. The rear leg assembly 17 raises the frame 10 to position the frame for pipeline insertion or retraction. The track frame 130 may include an integrated power source 129, seat 132, and a control panel 133. The seat, control panel, and operator may be housed by a weather and safety enclosure (not shown). FIG. 16B shows the pipe thruster in a stowed position, for transport, with the front anchor 11 rotated onto the frame 10, and the rear leg assembly 17 lifted. The thruster may then be transported over the tracks T.

The bi-directional driver 7 of the pipe thruster will now be described in further detail with reference to FIGS. 3 and 4. In one embodiment, the bi-directional driver 7 includes a hydraulic cylinder and cable drive system 30. The drive system 30 applies forces to the collar 19, which grips the pipeline 25, to move the pipeline into and out of the borehole. The drive system 30 includes two double-ended hydraulic cylinders 33, one on each side of the collar. Only one cylinder 33 is shown in FIGS. 3-4, for clarity (two are shown in FIGS. 14A-B and discussed below). The cylinder 33 operates a rod 35 having two opposite ends 35a and 35b. The cylinder 33 operates a piston 32 back and forth, from its far left-most position (shown in FIG. 3) to its far right-most position (shown in FIG. 4). The rod 35 is carried by the piston 32. When the piston is at its left-most position (FIG. 3), the first end 35a of the rod extends from the cylinder to the left. When the piston is at its right-most position (FIG. 4), the second end 35b of the rod extends from the cylinder to the right. The cylinder 33 itself is stationary with respect to the rest of the drive system. The cylinder 33 is firmly mounted to the central frame 10 (see FIG. 1).

Two cables 36a, 36b and two sheaves 37a, 37b are employed in connection with the rod 35 and cylinder 33. The first cable 36a extends between a fixed endpoint 38a, where the cable is securely attached to the central frame 10, and the collar 19, where the cable is connected at attachment 39a. The second cable 36b extends between the collar 19, at attachment point 39b, to a second fixed endpoint 38b, where the second cable is securely attached to the central frame 10. Thus the fixed endpoints 38a, 38b are the points at which the cables bear against the central frame 10, when the cables are drawn in tension by the driver.

The cables extend around sheaves 37a and 37b, respectively. The sheaves 37a and 37b are connected to opposite ends of the rod 35. A leaf chain may be used in place of each cable. Although the present invention has been described with reference to a chain or cable, any suitable flexible force transmitting member or tensile member may be used. A further embodiment including a chain driver is discussed below with reference to FIG. 13.

In FIG. 3, the hydraulic cylinder 33 is energized by hydraulic fluid H flowing into the cylinder head 34a (as shown in the inset), forcing the piston 32 to the left-most position. The piston carries with it the rod 35, as well as the sheaves 37a, 37b. These components move in the direction of arrow F to the far left-most position, as shown in FIG. 3. The cables are fixed to the frame 10 at points 38a and 38b. The movement of the piston and rod to the left, in the direction of arrow F, draws the cables around the sheaves 37a, 37b and thus draws the collar 19 also in the direction of arrow F. When the collar is grippingly engaged with the pipeline 25 (as described further below), this movement of the cylinder and cable system 30 draws the collar 19 and the pipeline 25 in the direction of arrow F. This may, for example, move the pipeline into the borehole 26.

The drive system 30 can be operated in the reverse direction to remove the pipe from the borehole. In FIG. 4, the energized hydraulic fluid H is now pumped into cylinder head 34b (as shown in the inset), driving the piston 32 toward its right-most position. The piston carries the rod 35 and the sheaves 37a, 37b in the direction of arrow A, with rod end 35b extending out from the cylinder. The cables 36a, 36b are drawn around the sheaves, and as a result the collar 19 is driven in the direction of arrow A. When the collar 19 is energized to grip the pipeline, the pipeline is also driven in the direction of arrow A. This may, for example, withdraw the pipeline from the borehole 26.

The movement of the rod 35 and attached sheaves 37a, 37b draws the cables around the sheave and pulls the collar 19 with the cables. The cables bear against the central frame 10 at attachment points 38a, 38b. Thus the force applied by the driver to the pipeline is reacted against the central frame 10, which transmits this load to the front anchor 11 and into the ground. A guide may be provided along the path of the rod 35, capturing the end of the rod at each extended position, so that the extended rod does not buckle.

The double-ended cylinder 33 can move in either direction with equal force and velocity over the rod 35. Thus there is no loss of force or velocity in reversing the driver to withdraw the pipe from the borehole. The cylinder 33 simply extends the rod 35 in the opposite direction, with equal force. In one embodiment, the cylinder 33 has equal area and displacement on either side, and is operated with the same volume rate, and pressure, such that the cylinder can apply the same force and speed in either direction of travel. Whether moving the collar forward or in reverse, the same force is applied regardless of the direction of travel. The double-ended cylinder enables the drive system 30 to retract the pipe from the borehole at a force and velocity equal to the thrusting force. Thus there is no loss of speed or force in retracting the pipe. If desired, the cylinder 33 could be operated with various parameters in order to adjust the force and speed of travel in either direction.

This design enable the driver 7 to operate in forward and reverse, to move the pipe in either direction, without requiring the pipe thruster 1 to be disassembled and reconfigured. The system is available to move the pipe in either direction on command. Additionally, the driver 7 is mounted to and reacts against the same frame 6 that guides the pipe into the borehole, rather than being attached to a separate structure apart from the pipe guiding frame.

The double-rod cylinder and cable system 30 moves the collar 19 across a distance B, as shown in FIG. 4. This distance B is twice the stroke distance C of the piston 32 within the cylinder 33, due to the action of the cables around the sheaves. The cables pull the collar twice the distance of the piston 32, at half the force. The stroke length of the collar 19 is twice the stroke length of the cylinder piston 32. The compact drive system 30 is thus able to draw the collar 19 across a substantial distance. This arrangement allows use of robust and efficient hydraulic cylinders to lineally force pipelines into, or out of, boreholes. Additionally, the drive system 30 accomplishes this larger collar stroke B while still minimizing the overall operational length of the system. Thus the drive system packages conveniently within the trailer support frame and can be legally transported over roads and highways, without the need for special permits. The trailer support frame occupies a single trailer load.

As a further advantage, in one embodiment, the collar stroke B is equal to or greater than the stroke of the standard utility drilling rig 2 (see FIG. 8), which is simultaneously pulling the pipeline into the borehole from the opposite side. The distance of movement of the collar 19 matches the stroke of the drilling rig 2 at the opposite end of the borehole. That is, the distance that the collar moves with the pipe between its rear and forward positions, to either insert the pipeline into the borehole or to remove it, is at least the same distance as the stroke of the drilling rig removing the drill string at the opposite end of the borehole. In one embodiment the collar moves a greater distance than the drilling rig stroke, to provide some buffer so that the two systems do not have to be operated at exactly the same time. In one embodiment, this length is 15 feet or greater, such as 17 feet. As a result, both systems can be coordinated to work together at the same time, and neither system must be paused mid-stroke to wait for the other system to be re-set. This can save valuable time at the drilling site.

A further advantage of the system is the flexibility and tolerance provided by the cables. The collar 19 moves with the pipeline, and may be deflected up or down, or side to side depending on the thrusting movement of the pipeline into or out of the borehole. The pipeline may stray from center with a particular thrust stroke, or through a particular section of the borehole. However, the sheaves 37a, 37b, the rod 35, and the cylinder 33 are fixed, rigidly attached to the frame. The cable 36 can move with the pipeline as it moves away from center over the frame. The cable 36 can absorb some deflection and variation and allow this movement between the collar and the frame. The cable thus provides flexibility and tolerance as compared to a rigid or fixed connection between the collar and the frame. This flexibility reduces damage to the cylinder 33 and rod 35 due to lateral forces induced by the collar as it moves with the pipeline.

A cable drive system 30' according to another embodiment is shown in FIGS. 14A and 14B. In this embodiment, the collar 19 is driven by two hydraulic cylinder and cable assemblies, one on each side of the frame 10. As shown in FIG. 14A, the drive system 30' includes a first hydraulic cylinder and cable assembly 30A on one side of the frame 10, and a second assembly 30B on the opposite side of the frame 10. The collar 19 extends across the width of the frame 10 between the two assemblies 30A, 30B. Each assembly 30A, 30B includes a double-ended hydraulic cylinder 33 driving a rod 35. The rod 35 is connected to a pair of sheaves 37a, 37b. The double-ended cylinder 33 is fixed to the frame 10. For completeness and clarity, the view of the assembly 30A at the top of FIG. 14A is a view from below the hydraulic cylinder 33, and the view of the assembly 30B at the bottom of FIG. 14A is a view from above the hydraulic cylinder 33.

In the drive system 30', each sheave 37a, 37b is connected to a cable 36a or 36b, respectively. In this embodiment, two fixed sheaves or pulleys 38F are mounted to the frame 10 below the cylinders 33. The cables 36a, 36b extend from the collar 19 to the fixed pulleys 38F, and then loop around the fixed pulleys 38F and continue back to the collar 19. Thus, in one embodiment, both endpoints of the cable 36a, 36b are located on the collar 19, attached to the collar at connectors 82. Thus, two lengths of each cable pass between the respective endpoints. The fixed pulleys 38F take the place of the fixed endpoints 38a, 38b shown in FIGS. 3-4. The cables may be tensioned and adjusted at the connectors 82.

Each sheave 37a, 37b on each assembly 30A, 30B is supported on rollers 60 (FIG. 14B) that primarily prevent the hydraulic cylinder rod from laterally moving, thereby reducing the risk that the rod will buckle. The rollers roll smoothly over the frame 10 when the drive system 30' is operated. In one embodiment, the sheave is contained between two plates 62, one on each side of the sheave, and the plates are mounted on the rollers 60.

In another embodiment, the bi-directional driver 7 includes a chain driver such as chain drivers 64 or 65 shown in FIGS. 13A-B. A single chain driver 64 is shown in FIG. 13A. The single chain driver 64 includes a single chain 66 that is mounted to fixed endpoints 68A, 68B on opposite ends of the frame 10. The chain 66 passes through a drive system 70, which is mounted to the collar 19. In one embodiment, the drive system 70 includes one powered sprocket 71 and two idle sprockets 72A, 72B. The chain 66 passes in a serpentine path 118 through the drive system 70. The powered sprocket 71 can be rotated in either direction, clockwise or counter-clockwise. When the powered sprocket 71 turns, all three sprockets 71, 72A, and 72B engage the chain 66 and drive the collar 19 forward or backward along the chain 66, toward either fixed endpoint 68A, 68B.

A continuous chain driver 65 is shown in FIG. 13B. In this embodiment, the chain 66 is mounted at fixed endpoints 69A, 69B on the collar 19, rather than the frame 10. Alternatively, the chain 66 may be a continuous loop secured to the collar 19. The endpoints may be adjustable, to tension or adjust the chain 66. A powered sprocket 71 is mounted at one end of the frame 10, and an idle sprocket 72 is mounted at the opposite end. The chain 66 passes from one endpoint, around both sprockets, to the other endpoint, forming a continuous loop. The powered sprocket 71 is driven by a drive shaft 74. Instead of or in addition to the sprockets 71 and 72, a serpentine driver with a drive sprocket and two idler sprockets (like that of FIG. 13A) may be provided together and mounted to the frame 10. The powered sprocket(s) drive the chain 66 either clockwise or counter-clockwise, moving the collar 19 toward either end of the frame. The powered sprockets in the chain drivers 64 and 65 may be powered by a hydraulic, air, or electric power source.

In one embodiment, the driver 7 applies up to 30,000 or up to 40,000 pounds of force to the pipeline to force it into or out of the borehole. In another embodiment, the driver is capable of applying up to 200,000 pounds of force. In one embodiment, the driver is capable of applying force in the range of 10,000 to 200,000 pounds of force, and in another embodiment 50,000 to 100,000 pounds, and in another embodiment 20,000 to 50,000 pounds, and in another embodiment 30,000 to 40,000 pounds. This pipe thruster is well suited for utility pipeline installations as well as smaller transmission pipeline installations.

The bi-directional driver 7, such as the cylinder and cable systems 30 and 30' and chain drivers 64 and 65 described above, is coupled between the support frame 6 and the collar 19 to drive the pipe into or out of the borehole. The collar 19 releasably engages the outside surface of the pipe in order to move it in either direction. An embodiment of the collar 19 is shown in top view in FIG. 5. The collar 19 encompasses a section of the pipeline 25. The cables 36a, 36b are securely attached to the collar 19 at attachment points 39a, 39b, respectively, which can be adjusted to release or tighten or replace the cables. The cables can draw the collar in either direction, depending on the force applied by the driver. The pipe thruster 1 may include two drive systems 30 mounted to the frame 10, one on each side of the collar 19.

FIG. 6 shows an end view of the collar 19, and the mechanism for securing the collar 19 to the pipeline 25. The collar includes two hydraulic cylinders 44, one in each lower quadrant G, I of the collar. Only one cylinder 44 is shown in FIG. 6, in quadrant I, for clarity.

The cylinder 44, when hydraulically energized, extends and exerts force against thrust box 43, which is mechanically attached to a gripper shoe 42. The gripper shoe 42 is shaped to match the curvature of the outer surface of the pipeline 25. The surface of the gripper shoe 42 that faces the pipe includes a high-friction surface material 46 for firmly gripping the pipeline 25. When the cylinder 44 extends, it urges against the thrust box 43, which then moves the gripper shoe 42 radially inwardly to contact the pipe. The force applied by the cylinder forces the friction material 46 against the pipeline, and also pushes the pipeline up against fixed gripping shoe 47 in opposite quadrant J. The fixed gripping shoe 47 is attached to the upper structure of the collar. This shoe 47 also has a high-friction material along its pipe-facing surface.

In one embodiment, the hydraulic cylinder 44, thrust box 43, pipe gripping shoe 42, and friction material 46 are duplicated in quadrant G, and the fixed gripping shoe 47 is duplicated in quadrant H. The pipeline 25 is thus firmly gripped by the shoes 42 and 47, and the friction material 46 on these shoes, in all four quadrants. With the cylinders actively forcing the shoes against the pipe, the collar firmly grips the pipe, such that any lateral movement of the collar is transmitted to the pipe as well. The forces from quadrants G and I against the fixed reaction from quadrants J and H supply the necessary friction for the collar to transfer axial forces to the pipeline 25.

The cylinder 44, thrust box 43, and gripping shoe 42 in each of the two lower quadrants are aligned along a 45° angle from vertical, angled toward the center of the collar cavity 48. The equal positioning of the cylinders 44 and associated components within the lower quadrants allows uniform extension or retraction of these assemblies. The fixed gripping shoes 47 of the upper quadrants are established by the radius of the pipeline and are also angled toward the center of the collar cavity. The equally extending, aligned cylinders 44 and the concave gripping shoes 44 and 47 all radially converge toward the central axis of the collar cavity 48, to provide uniform engagement between the gripping shoes and the pipeline. This uniform engagement provides a secure gripping force and avoids damage to the pipeline and/or the collar.

The use of energized gripping shoes in the lower quadrants and fixed gripping shoes in the upper quadrants provides an additional advantage as compared to systems with four energized gripping shoes. In such other systems, the cylinders from the top quadrants can extend faster than the cylinders from the lower quadrants, due to gravity. The inequality of the cylinder stroke from the upper quadrants as compared to the cylinder stroke from the lower quadrants results in axial misalignment of the gripping shoes during pipe contact. When all cylinder strokes are not equal, the gripping shoes fail to evenly grip the pipe. However, according to an embodiment of the present invention, the top gripping shoes 47 are fixed, rather than being energized. Only the lower two gripping shoes 42 are powered into engagement, pushing the pipeline up against the fixed upper shoes. The radius of the shoes 25 matches the outer diameter of the pipeline, so that the pipeline is automatically centered when the lower shoes 42 lift the pipeline up against the upper fixed shoes 47. The four gripping shoes uniformly grip the pipe. This design avoids the difficulty of providing equal line pressure to cylinders in both the upper and lower quadrants. Additionally, if pressure in the line is lost, the upper shoes 47 remain in place, rather than falling inwardly toward the pipeline.

Figure 12C:
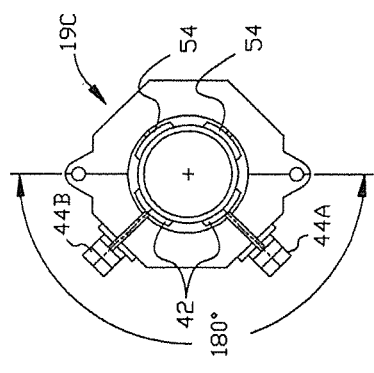
FIG. 12A is a partial front and partial cross-sectional view of a collar for a pipe thruster, according to an embodiment of the invention, with two enlarged inset areas.
FIGS. 12B, C, D, and E are a collection of figures showing a collar for use in a pipe thruster, according to an embodiment of the invention.
FIG. 12F is an end view of a collar according to an embodiment of the invention, showing collar separation.
FIG. 12G is an end view of a collar according to an embodiment of the invention, showing collar separation.
Figure 12E:
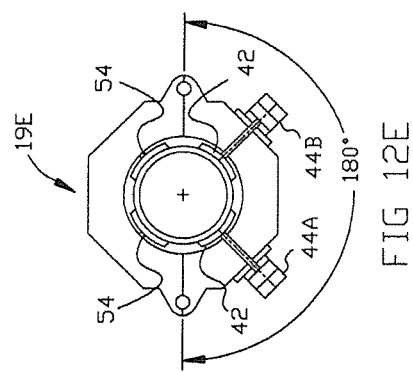
Figure 12B:
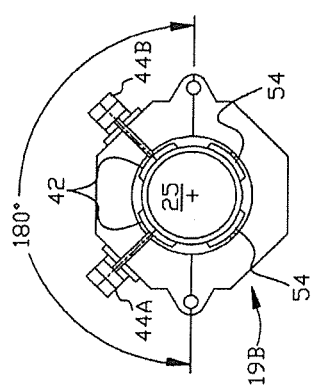
Figure 12D:
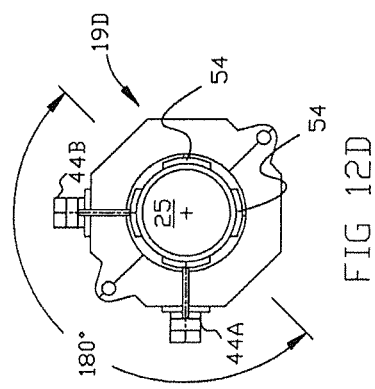

In one embodiment, as shown in FIGS. 12A and 15, a collar 19A includes two hydraulic cylinder assemblies 44A and 44B located in the top quadrants of the collar, rather than the bottom quadrants. The cylinder assemblies are shown in more detail in FIG. 15. The cylinder assemblies 44A, 44B each include a hydraulic cylinder 44C with a cylinder rod 107 coupled to a gripping shoe 42. The gripping shoe 42 is similar to the gripping shoe of the lower quadrants described above (FIG. 6). The hydraulic cylinder 44C may be an air cylinder, air bladder, or other actuator. The cylinder is operated to move the gripping shoe 42 downward to engage the pipeline 25, which passes through the center of the collar 19A (shown in FIG. 12A). The gripping shoes 42 may be referred to as active gripping shoes, as they are activated by the hydraulic cylinders 44C.

In one embodiment, the hydraulic cylinders 44A, B are mounted to the collar by two spherical bearings 58, one at each end of the cylinder 44C. The bearings are provided to accommodate the tolerances and stresses imposed on the system in operation. Tolerances within the collar 19A and the hydraulic cylinders need to be loose in order to accommodate various weather conditions, operating modes, and field conditions, to enable the system to continue to operate without jamming. During thrusting, lateral forces K may be imparted on the cylinder rod 107, which could apply stresses to the cylinder seal 106. The bearings 58 reduce this lateral load condition and potential seal failure. The bearings 58 enable the cylinder 44C to wobble and center itself with respect to the shoe 42 that grips the pipe. The bearings 58 allow the cylinder and associated gripping shoe to adjust to the outer surface of the pipeline 25, even when the pipeline is off-center, vibrated, or non-uniform. In FIG. 15, loose tolerances are indicated at 109 between the cylinder wall 114 and the outer sleeve 108. Any suitable flex structure may be used in place of the bearings 58, to allow the cylinder 44C to freely move to avoid a bending moment on the cylinder.

Referring again to FIG. 12A, two cylinder assemblies 44A, 44B are shown in the upper quadrants of the collar 19A, each activating a gripping shoe to grip the pipeline 25. In another embodiment, a single cylinder (not shown) drives both active gripping shoes, rather than supplying a separate cylinder for each gripping shoe.

Referring again to FIG. 12A, two fixed gripping shoes 54 are located in the lower quadrants of the collar 19A. The fixed gripping shoes 54 are connected to the collar by a pin 56. The pin enables the shoes 54 to rotate about the axis of the pin (in the direction of arrow T) in order to adjust to receive the pipeline 25, for greater contact or seating between the shoe and the pipe. This results in increased contact area for greater thrusting forces against the pipe. The shoes 54 may be spring-loaded or weighted about the pin 56 to bias the shoes 54 into a symmetric position about the pin 56 and the pipeline 25. Although the shoes 54 rotate about the pins 56, the shoes 54 are referred to as "fixed" because the pin 56 is fixed to the collar 19 and does not move the shoes 54 toward or away from the pipeline with a hydraulic cylinder, like the upper active gripping shoes.

The two active gripping shoes 42 (shown in FIG. 15) are located in the two upper quadrants of the collar. In other embodiments, they may be located in any two other adjacent quadrants. That is, they may be located in the two left quadrants, the two lower quadrants, the two right quadrants, or the two upper quadrants. A few different options for the collar (19B, 19C, 19D, and 19E) are illustrated for clarity in FIGS. 12B, 12C, 12D, and 12E. The two active gripping shoes 42 (with their corresponding cylinders 44A, 44B) are both located within the same 180-degree hemisphere of the collar. The fixed gripping shoes 54 are positioned opposite the active gripping shoes 42, such that each active gripping shoe 42 presses the pipeline against the fixed shoe 54 in the opposite quadrant. The active gripping shoes 42 press the pipeline 25 against the fixed gripping shoes 54 such that the pipeline is firmly gripped by all four gripping shoes.

Referring again to FIG. 12A, the pipe thruster includes two I-beam guides 80, one on each side of the collar 19A. The I-beam guides 80 are mounted to the floor of the frame 10. The collar itself is supported by four rollers 76, two on each side of the collar (only one shown in FIG. 12A). The rollers 76 fit within a channel 78 formed by the I-beam guide 80. The I-beam guide 80 reinforces the path of the rollers 76 to guide the collar 19A in a straight path along the frame 10. The rollers 60 that support the sheaves 37 (see FIGS. 14A-B) fit within the same channel 78, one roller on each side of the I-beam 80. The two I-beams 80 on each side of the frame work to prevent rotation of the collar and the sheaves as they move along the frame. By constraining the movement of the collar and the sheaves, the I-beams 80 confine the rod 35 (see FIGS. 3, 4, 14A-B) to move it in a straight path along the frame 10, so that the rod is less likely to deviate up or down or twist as it is driven by the double-ended cylinder 33.

Referring again to FIG. 12A, in one embodiment, the channel 78 includes one or more spacers 79 for snugly capturing the roller 76 inside the channel and preventing material deformation. The spacer 79 may be formed of an anti-friction material to reduce friction for the roller 76. In one embodiment, the spacer 79 includes a heat-treated or high strength steel or other material. Additionally, in one embodiment, the roller 76 (and/or the roller 60 from FIGS. 14A-B) includes a flange 199 which traps the roller 76 within the channel 78 of the I-beam guide 80. The flanged rollers support the collar 19A vertically, laterally, and torsionally.

FIG. 12F shows a collar 19F according to an embodiment of the invention. The collar 19F is divided into two pieces that are separable to open the collar to receive or remove the pipeline 25. In one embodiment, the collar 19F includes an upper portion 156a that is attached at a hinge 163 to a lower portion 156b. The upper portion 156a can be rotated about the hinge 163 to expose the central cavity 157 of the collar 19F. A hydraulic cylinder 165 may be provided to assist in lifting and rotating the upper portion 156a, or this movement may be done manually or by other actuators (such as a crane). The upper portion 156a may be rotated to an open position as shown in FIG. 12F, or entirely removed from the lower portion 156b. When the pipeline has been inserted into the cavity 157, the upper portion 156a is moved back into position and secured to the lower portion 156b by mating connectors 164. In one embodiment, the connectors 164 include openings that align and receive a pin to fix the upper portion 156a to the lower portion 156b. The connectors 164 may provide a quick-pin disconnection. Other types of mechanical fasteners may be used, such as nuts and bolts. The collar 19F can be easily opened or closed to allow access to the pipeline for repair, service, or pipeline insertion or removal. In FIG. 12F, the collar 19F is split about a horizontal axis 156.

FIG. 12G shows a collar 19G according to an embodiment of the invention. The collar 19G is split about a vertical axis, into two side portions 167a, 167b. Each side portion is connected to the lower portion 156 of the collar by a hinge 163a, 163b, respectively, and the side portions may be raised and lowered by hydraulic cylinders 165 (or by other actuators, or by manual operation). The two side portions can be connected and released from each other by mating connectors 164. The rotation of the side portions 167a, 167b exposes the collar cavity 157 to access the pipeline 25.

In one embodiment, as shown in FIG. 9, the pair of upper gripping shoes 47 spans less than a full 180°. That is, as the upper gripping shoes 47 extend downwardly from the top, they reach their respective end 47A before coming to the horizontal centerline C of the cavity. This relief in the shoes provides clearance for the widest part of the pipeline to move through the cavity. The gripping shoes may be chamfered at their ends 47A to provide this relief near 180°. In one embodiment, this relief is about 10° on each side.

As shown in FIGS. 10-11A, in one embodiment, a collar 19" includes a V-block or roller 49 that is used to lift the pipeline 25 into the collar cavity, before activation of the gripping shoe cylinders 44. The roller 49 is positioned below the pipeline 25 and is connected to a hinged arm 50 that is driven in an upward arc by an attached hydraulic cylinder 51. This movement drives the roller upwardly and moves the pipeline 25 into a proper seating against the gripping shoes. Then, the cylinders 44 are energized to drive the active gripping shoes into engagement with the pipe. With the pipe already lifted and centered, the cylinders 44 can then drive the gripping shoes 42 directly into alignment with the pipeline. The roller 49 lifts the pipeline straight up, and then the cylinders 44 drive the gripping shoes inwardly at 45° angles toward the pipe. The roller 49 thus ensures that the gripping shoes are all properly aligned with the pipeline. The roller or V-block may be provided behind or in front of the collar, as shown for example in FIG. 11A.

Additionally, the roller may be used when the collar is moved along the pipeline to reset the position of the collar. As shown in FIG. 9, without the benefit of the roller 49, the lower portion of the pipeline 12 rests against the lower portions 52 of the collar cavity, due to gravity. As the collar travels over the pipeline to its starting position, the lower portion of the collar can scrape against the pipeline, damaging the pipeline, the pipeline outer coating, and/or the collar. Accordingly, the roller 49 can be lifted partially, to hold the pipeline within the cavity above the lower gripping shoes and below the upper gripping shoes. In this way, as the collar is moved along the pipeline to re-set the position of the collar, the pipeline does not rub or scrape against the gripping shoes. Alternatively, the retracted position of the roller 49 can be set to be above the retracted position of the lower shoes, so that the roller need not be energized in order to retain the pipeline above the collar to prevent rubbing or scraping.

Figure 11C:
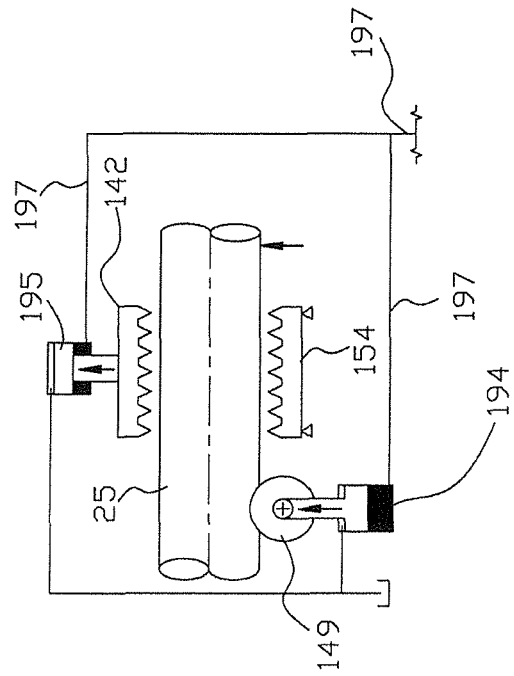
FIG. 11C is a side schematic view of the collar of FIG. 11B, with the roller mechanism in an engaged position.
Figure 11B:
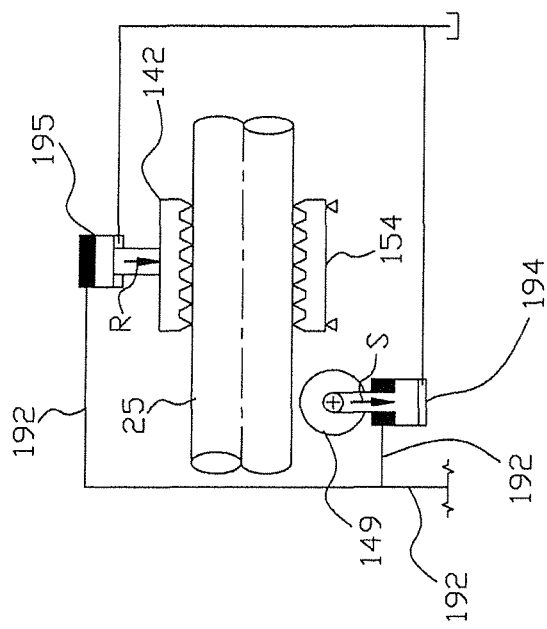
FIG. 11B is a side schematic view of a collar having a roller mechanism, shown in a retracted position, according to an embodiment of the invention.

An actuator such as a roller 149 according to another embodiment is shown schematically in FIGS. 11B and 11C. As before, the roller actuator 149 is used to lift the pipeline 25 out of contact with the lower gripping shoes of the collar. In this embodiment, the collar is shown having lower fixed gripping shoes 154 and upper active gripping shoes 142.

The roller 149 is coupled to hydraulic circuits 192 and 197, which are designed to operate the active gripping shoes 142 and the roller 149 together. The roller 149 is coupled to a hydraulic cylinder 194, and the gripping shoes 142 are coupled to a hydraulic cylinder 195. The circuits 192, 197 are coupled to these cylinders. In one embodiment, the circuits 192, 197 are hydraulic circuits. In FIG. 11B, the circuit 192 is activated to extend the cylinder 195 and retract the cylinder 194. This movement causes the upper active shoe 142 to press against the pipeline 25, thereby pressing the pipeline 25 against the lower fixed shoe 154. At the same time, the cylinder 194 retracts the roller 149 away from contact with the pipeline. The collar can be used in this position to thrust the pipeline.

In FIG. 11C, the circuit 197 is activated to reverse the cylinders—extending the cylinder 194 and retracting the cylinder 195. The cylinder 195 retracts the upper active gripping shoe 142 away from the pipeline. At the same time, the cylinder 194 extends the roller 149 and presses it up against the pipeline 25, lifting the pipeline 25 out of contact with the lower fixed gripping shoe 154. In this position, the pipeline 25 can move freely through the central cavity of the collar without scraping against the collar surfaces.

In various embodiments, the leading edges of the collar and gripping shoes are coated with a protective coating in order to cover any sharp edges. Referring to FIGS. 9 and 11, the collar has leading edge 19L, and the upper shoes 47 include leading edges 47L (the lower shoes are not shown, for clarity). These leading edges 19L and 47L are coated with a protective coating such as a rubber or plastic material. The protective coating provides a smooth edge, so that the collar and shoes do not scratch or damage the outer surface of the pipeline as the pipeline moves through the collar. Additionally, the outer surface of the pipeline itself may also be coated with a rubber or plastic material to protect the pipeline. In another embodiment, a bumper or guide may be attached to the leading edge of the collar and shoes. In one embodiment, the bumper is made of high-density polyethylene.

Various shoes 42 and 47 may be provided with different curving surfaces 46, to match the diameters of various pipelines of different sizes. In various embodiments, the shoes may match pipes of about 30 inches in diameter or smaller.

Another embodiment of a collar 19' for a pipe thruster according to an embodiment of the invention is shown in FIG. 7. In this embodiment, the collar 19' is separable into two parts—an upper collar 41 and a lower collar 40. The upper collar 41 can be separated (such as by removing the bolts 45) from the lower collar 40 to access the pipeline 25, such as to remove the pipeline from the collar. The two collar pieces fit together to form a cavity 48 between them, for receipt of the pipeline. The collar 19' is situated within the central frame 10, and is operably coupled to the drive system 30, as described above.

In place of the thrust box and gripping shoes, the collar may include a plurality of slips that are driven forward to grip the outside surface of the pipe. These slips may be driven by hydraulic cylinders and cammed inwardly by camming surfaces into engagement with the pipe. A second set of slips may be provided to grip the pipe for movement in reverse.

The above process, whether moving the pipeline into or out of the borehole, can be fully automated. For example, the power and control module 22 may include a controller that is provided with control instructions to send signals to the cylinders 33, 44 to grip and drive the pipe as described above. The controller can also halt the process as part of a scheduled pause or in emergency situations.

In one embodiment, the pipe thruster is used to drill the borehole itself, by thrusting a pipeline with an excavating drill head attached to the leading end of the pipeline. A motor at the front of the pipeline may be fed by hydraulic fluid to drive the drill head.

As an alternative to the drive system 30 shown in FIGS. 3 and 4, the bi-directional driver 7 may take the form of a standard hydraulic cylinder, or a pair of double-ended hydraulic cylinders connected in series, or a rack and pinion or winch/cable/sheave arrangement, or other suitable drivers. The driver is mounted to the central frame 10 and is coupled between the central frame 10 and the collar 19.

In one embodiment, a pipe thruster 101 works in conjunction with a drilling machine 102 during reaming operations. In one embodiment, the additional cooperation of the pipe thruster 101 during reaming reduces the total number of reaming steps to enlarge the borehole. The pipe thruster 101 includes an auxiliary rotary drive attachment 147, which connects to the drill string during reaming, to reduce multiple reaming steps to one step, saving substantial operational time and wear on the drilling machine 102 as well as down-hole tools such as the drill pipes and reamers. The reaming step is shown in FIGS. 17A and 17B. The pipe thruster 101 and the drilling machine 102 work together to enlarge the pilot hole 137 into the borehole 26 by pulling the drill string 139 through the hole in the direction of arrow M. A reaming head 149 is carried by the drill string 139 to widen the borehole (see FIG. 17B).

The rotary drive attachment 147 couples the drill string to the thruster to enable the thruster to drive the drill string 139 forward. The rotary drive attachment 147 connects to the drill string, as described further below, and is attached to the collar 119 of the pipe thruster. The collar 119 is then driven by the thruster as described in embodiments above. The result is the collar 119 forcefully driving the drill string 139 through the pilot hole 137 in the direction of arrow M, with the reaming head 149 attached to widen the hole into the borehole 26.

As shown in FIG. 17C, the rotary drive attachment 147 is fixed to the collar 119 of the pipe thruster 101. The collar 119 includes a shoe adapter 150 that secures the rotary drive attachment 147. As shown in FIGS. 17C and 17D, the rotary drive attachment 147 includes a rotary motor 151 that is used to connect the attachment 147 to the drill string. The motor 151 drives a shaft 155 through a clutch mechanism 152. The shaft is axially and radially constrained by a bearing and seal pack 153 within an outer housing 154. When the clutch 152 is engaged, the motor 151 drives the shaft 155 to forcefully rotate, in order to connect the shaft 155 to the drill string 139. The forward end of the shaft 155 includes a threaded opening for threadedly attaching to the drill string 139 (see FIG. 17C). The clutch 152 is then dis-engaged, to allow the drilling machine 102 on the other side of the borehole to forcefully rotate the drill string 139 and the reamer 149 without rotary interference from the pipe thruster 101. The collar 119 is then activated to pull the drill string 139 in the direction of arrow M, in cooperation with the drilling machine 102 on the opposite side of the borehole. The motor 151 can then be re-engaged through the clutch 152 to disconnect from the drill string 139 to break a segment of drill pipe from the drill string. Gears may be provided as needed between the clutch and motor to provide the torque needed for making or breaking pipe connections.

In operation, as the drilling machine 102 rotates the drill string 139 and reamer 149 (in the direction of arrow N, see FIG. 17B), the thruster 101 draws the drill string 139 and the reamer 149 toward the borehole exit 146. Once the reamer 149 has been drawn through the hole, widening the borehole in a single reaming step, the rotary drive attachment 147 is disconnected from the drill string 139 and from the collar 119 of the thruster 101. The thruster 101 is then ready to engage in pipe thrusting operations to thrust the pipeline through the widened borehole 26.

In one embodiment, a drilling system includes an additional securement mechanism for fixedly securing the front anchor, as shown in FIGS. 18A-18C. In the embodiment of FIG. 18A, a front anchor 11' includes a securement mechanism 201A. The securement mechanism 201A includes a helical high load tension anchor 178, which passes through the front anchor 11' into the ground. In one embodiment, the helical tension anchors 178 include a shaft portion and one or more helical bearing plates connected to the shaft portion for engaging the ground. The shaft portion of the tension anchors may have any suitable shape, such as square, rectangular, or tubular. The helical bearing plates may include split circular plates connected to the shaft. In one embodiment, the helical bearing plates extend circumferentially around the shaft and have split ends longitudinally spaced apart along the shaft (see FIGS. 18A and 18B). FIGS. 18A and 18B depict a tension anchor 178 having three helical bearing plates. However, it will be appreciated that the tension anchors 178 may include any suitable number of helical bearing plates. The helical bearing plates are configured to secure the pipe thruster to the ground by increasing the shear forces on the tension anchors. More specifically, the helical bearing plates are configured to secure the pipe thruster to the ground by increasing the "plug" (i.e., the vertical column of soil above the helical bearing plates) that must be displaced to move the pipe thruster, as compared to conventional threaded ground screws.

The tension anchor 178 includes a nut 206 which can be tightened downwardly along threads 219 to bear against the front anchor 11' and push the front anchor tightly against the ground 190. The securement mechanism 201A also includes a frictional material 189 provided along a bottom surface 217 of the front anchor 11'. This frictional material 189 is pressed between the front anchor 11' and the ground, or roadway pavement, 190 by the tension anchor 178. The frictional material 189 may be bonded to the bottom surface 217 of the front anchor 11'. In one embodiment, the frictional material 189 is a material with a high coefficient of friction, such as rubber. The frictional material resists lateral movement along the ground 190, at the interface 186 between the material and the ground, thereby providing additional lateral support to the front anchor 11'. In one embodiment, the securement mechanism 201A is utilized along concrete pavement or other hard ground surface.

Another embodiment is shown in FIG. 18B. In this figure, a front anchor 11" includes a securement mechanism 201B. In one embodiment, the securement mechanism 201B is utilized along a soil surface. The securement mechanism 201B includes cleats 187 provided along the bottom surface 217 of the front anchor 11". A helical tension anchor 178 passes through the front anchor 11" and is secured to the earth 179. The helical tension anchor 178 is used to provide a downward force on the front anchor 11", such as by tightening the nut 206, or by providing a downward force from hydraulic pump 208 and hose 209 to a hydraulic jack or cylinder 207. The downward force applied to the front anchor 11" presses the cleats 187 into the ground. The embedded cleats then resist lateral forces applied to the front anchor 11", by bearing horizontally against the earth material 179.

Another embodiment is shown in FIG. 18C. In this figure, a front anchor 11''' includes a securement mechanism 201C. The securement mechanism 201C includes several alternate plates 191a, 191b, 191c that can be attached to the front anchor 11''' depending on the ground condition. The plate 191a has a steel facing 205 for welding onto steel surfaces such as steel deck barges. The plate 191b includes a frictional material 189 (such as rubber) for resisting slippage along street pavement or other hard surfaces. The plate 191c includes cleats 187 for bearing against soil formations. Each plate includes connectors 210 that mate with corresponding receptacles 222 in the front anchor 11'''. In one embodiment, bolts 211 are utilized to secure the plates to the front anchor at the receptacles 222. The securement mechanism 201C provides flexibility for securing the front anchor 11''' to a variety of ground surfaces.

The securement mechanisms in FIGS. 18A-C are described with reference to a pipe thrusting machine, but may also be used with drilling machines or other equipment that is secured to the ground at the drilling site.

In another embodiment, a pipe thruster 301 includes a drilling attachment 302. The drilling attachment 302 may be used to operate the pipe thruster 301 as a drilling machine, to drive a drill string 303 into a borehole. The drilling attachment may be useful for assisting in drilling operations, for example when the drill string becomes stuck, or when the main drilling machine is not available, such as for repairs or service. The drilling attachment includes a drill head 314 that is attached to a lower portion of the collar 319 of the pipe thruster 301. The drill head 314 may be attached to the collar by using the mating connections provided on the collar for thrusting operations. For example, the drill head 314 may be attached to the lower portion 156b of the collar 19F (see FIG. 12F) by utilizing the same connectors 164 provided on the collar. Referring again to FIGS. 19A-B, the drill head 314 includes a motor that rotates a spindle. The spindle is connected to the drill string 303 to transmit rotation from the drill head 314 to the drill string 303. The collar 319 is driven forward by the pipe thruster's bi-directional driver 307, to advance the rotating drill head 314 and advance the drill string 303 into the borehole 26.

The drill head 314 is also connected to a mud hose 320 carried by a hose carrier 321 that is mounted to the side of the central frame 310. The mud hose 320 supplies mud through the drill head 314 and drill string 303 to the front of the borehole, to lubricate the borehole and flush away debris. A mud pump (not shown) is provided to pump mud through the hose 320, and the mud pump may be mounted to the central frame 310 or provided separately. The pipe thruster 301 may also be provided with a catwalk or frame 318 for users to approach and access the pipe thruster 301. In one embodiment, the catwalk 318 is mounted to the central frame 310 on the side opposite from the hose carrier 321.

The top drive motor in the drill head 314 may be powered by the same power source that is used to operate the pipe thruster during pipe thrusting operations. A local or remote control panel 322 may be provided to control the pipe thruster 301, such as wirelessly or through wired connections.

The drilling attachment 301 also includes a break-out tool 316 mounted to the central frame 310. The break-out tool 316 is used to make and break connections between the segments of drill pipe as the drill string is advanced (or withdrawn) from the borehole 26. In one embodiment, the break-out tool is an iron roughneck bolted to the central frame 10 between the collar 319 and the front anchor 311.

Further details of the drill head 314 and its attachment to the collar 319 are shown in FIGS. 19C-E. The collar 319 includes a lower collar portion 356 which receives the drill head 314. The drill head includes a rotary shaft 323 which is driven by a rotary drive motor 325 through a mechanical clutch 324. The drill head 314 is mounted to the lower collar portion 356 by a mounting structure 326, which in one embodiment includes a plate that is bolted to the lower collar portion 356 (see FIG. 19C). The drill head also includes a drilling fluid swivel 327 for connection to the mud hoses 320, and a bearing housing 328 surrounding the shaft 323. The shaft 323 includes a threaded front end for threaded connection to the drill string 303 (FIG. 19B). The shaft 323 includes a passage for flow of mud through the shaft.

In one embodiment, other auxiliary attachment devices may be provided to attach to the pipe thruster 301. For example, in one embodiment, as shown in FIGS. 19A-B, an auxiliary lifting crane 317 is attached to the front anchor 311 of the pipe thruster 301, to assist in positioning and removing segments of drill pipe. The crane 317 may be secured to the central frame 310 instead of or in addition to the front anchor 311, and may employ a pile or tension anchor to further secure the crane to the ground. In another embodiment, instead of or in addition to a crane, an automatic pipe feeder is used to feed segments of drill pipe to the pipe thruster with the drilling attachment 302.

As demonstrated, the driver 13 is a bi-directional driver that can readily move the pipe in either direction, into or out of the borehole, without pausing for disassembly and reassembly. The pipe thruster embodiments described herein are particularly useful in a horizontal directional drilling system for installing utility pipelines, such as pipelines for power and telecommunication lines. In one embodiment, the pipeline has a diameter of about 30 inches or less. The pipe thruster is road and highway transportable, and may be incorporated into a trailer for easy transport by a truck to the drilling site.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A portable pipe thrusting apparatus for inserting and removing a pipe from a borehole, comprising:
   a collar configured to releasably grip the pipe;
   a support frame;
   at least one rear leg assembly coupled to a rear end of the support frame, the at least one rear leg assembly configured to move the rear end of the support frame between a lowered position and a raised position to align the pipe with the borehole; and
   a bi-directional driver coupled between the collar and the support frame, the driver configured to drive the collar toward and away from the borehole to insert and remove the pipe from the borehole.

2. The portable pipe thrusting apparatus of claim 1, wherein the rear leg assembly comprises:
- a first telescoping extension member coupled at an upper end to the support frame, the first telescoping extension member configured to move between a retracted position and an extended position; and
- a second telescoping extension member coupled at an upper end to the support frame, the second telescoping extension member configured to move between a retracted position and an extended position,
- wherein a lower end of the first telescoping member is coupled to a lower end of the second telescoping member.

3. The portable pipe thrusting apparatus of claim 2, further comprising a foot configured to engage the ground, wherein the lower end of the first telescoping extension member is coupled to the foot and the lower end of the second telescoping extension member is coupled to the foot.

4. The portable pipe thrusting apparatus of claim 1, wherein the at least one rear leg assembly comprises:
- a first rear leg assembly having a first extension member configured to extend a first distance; and
- a second rear leg assembly having a second extension member configured to extend a second distance,
- wherein the first and second rear leg assemblies are on opposite sides of the support frame.

5. The portable pipe thrusting apparatus of claim 4, wherein the first distance is greater than the second distance.

6. The portable pipe thrusting apparatus of claim 4, further comprising a foot configured to engage the ground, the foot extending between the first and second rear leg assemblies and extending laterally across the frame support.

7. The portable pipe thrusting apparatus of claim 2, wherein one of the first and second telescoping extension members comprises a hydraulic cylinder configured to drive the first and second telescoping extension members between the retracted and extended positions.

8. A portable pipe thrusting apparatus for inserting and removing a pipe from a borehole, comprising:
- a collar configured to releasably grip the pipe;
- a support frame comprising a front anchor and a central frame, wherein the front anchor is securable to the ground between the central frame and the borehole, and wherein the front anchor is hingedly connected to a front end of the support frame and is movable between a stowed position and an extended position engaging the ground; and
- a bi-directional driver coupled between the collar and the support frame, the driver configured to drive the collar toward and away from the borehole to insert and remove the pipe from the borehole.

9. The portable pipe thrusting apparatus of claim 8, wherein the driver is coupled to the front anchor to assist in rotation of the front anchor.

10. The portable pipe thrusting apparatus of claim 8, wherein the stowed position of the front anchor is on top of the central frame.

11. The portable pipe thrusting apparatus of claim 8, further comprising a hydraulic cylinder coupled to the front anchor and configured to drive the front anchor between the stowed position and the extended position.

12. The pipe thrusting apparatus of claim 8, further comprising an anchor plate removably attachable to a lower surface of the front anchor.

13. The pipe thrusting apparatus of claim 12, wherein the anchor plate comprises a plurality of cleats protruding from a lower surface of the anchor plate and configured to extend into the ground.

14. The pipe thrusting apparatus of claim 12, wherein the anchor plate comprises a weldable material.

15. The pipe thrusting apparatus of claim 12, wherein the anchor plate comprises a frictional material for resisting slippage between the anchor plate and the ground.

16. A portable pipe thrusting apparatus for inserting and removing a pipe from a borehole, comprising:
- a collar configured to releasably grip the pipe;
- a support frame comprising a front anchor and a central frame, wherein the front anchor is securable to the ground between the central frame and the borehole;
- a bi-directional driver coupled between the collar and the support frame, the driver configured to drive the collar toward and away from the borehole to insert and remove the pipe from the borehole;
- at least one opening in the front anchor; and
- at least one support member received in the at least one opening, the at least one support member configured to connect the front anchor to the ground.

17. The portable pipe thrusting apparatus of claim 16, wherein the at least one support member comprises a pile extending into the ground.

18. The portable pipe thrusting apparatus of claim 16, wherein the support member comprises a soil screw or helical tension anchor configured to be placed in tension to draw the support member against the ground.

19. The portable pipe thrusting apparatus of claim 18, wherein the helical tension anchor comprises:
- a shaft; and
- at least one helical bearing plate extending around the shaft, the helical bearing plate having first and second ends longitudinally spaced along the shaft.

20. The pipe thrusting apparatus of claim 16, wherein the at least one support member comprises:
- a piling having a longitudinal bore, a lower portion of the piling extending into the ground; and
- a helical tension anchor received in the longitudinal bore, a lower portion of the helical tension anchor extending from the lower portion of the piling into the ground.

21. The pipe thrusting apparatus of claim 16, wherein the at least one support member comprises:
- a piling having a longitudinal bore, a lower portion of the piling extending into the ground; and
- a tension rod received in the longitudinal bore, a lower portion of the tension rod extending from the lower portion of the piling into the ground.

22. The pipe thrusting apparatus of 16, wherein the at least one support member comprises a plurality of pilings extending obliquely into the ground.

23. A portable pipe thrusting apparatus for inserting and removing a pipe from a borehole, comprising:
- a collar configured to releasably grip the pipe;
- a support frame; and
- at least one bi-directional driver comprising a double-ended hydraulic cylinder coupled to a tensile force transmitting member,
- wherein the tensile force transmitting member is secured to the collar and the cylinder is secured to the support frame, and wherein the driver is configured to drive the collar toward and away from the borehole to insert and remove the pipe from the borehole.

24. The portable pipe thrusting apparatus of claim 23, wherein the at least one bi-directional driver comprises first and second bi-directional drivers on opposite sides of the collar.

25. The portable pipe thrusting apparatus of claim 23, wherein the cylinder comprises a rod with first and second sheaves at first and second opposite ends of the rod, and wherein the cylinder comprises a piston that drives the rod to first and second extended positions on either side of the cylinder.

26. The portable pipe thrusting apparatus of claim 25, wherein the tensile force transmitting member comprises a first cable or chain secured at opposite ends to the support frame and the collar and extending over the first sheave, and a second cable or chain secured at opposite ends to the support frame and the collar and extending over the second sheave.

27. The portable pipe thrusting apparatus of claim 25, wherein the first and second sheaves are slidable along rollers in the support frame, and wherein the tensile force transmitting member comprises a first cable or chain secured at opposite ends to the collar and extending over the first sheave, and a second cable or chain secured at opposite ends to the collar and extending over the second sheave.

28. The portable pipe thrusting apparatus of claim 23, wherein the cylinder comprises a piston with a piston stroke distance, and wherein the driver drives the collar through a collar stroke distance, and wherein the collar stroke distance is twice the piston stroke distance.

29. The portable pipe thrusting apparatus of claim 28, wherein the collar stroke distance is at least 15 feet.

30. The portable pipe thrusting apparatus of claim 23, wherein a length of the pipe thrusting apparatus is 40 feet or less.

31. A portable pipe thrusting apparatus for inserting and removing a pipe from a borehole, comprising:
  a collar configured to releasably grip the pipe;
  a support frame;
  a bi-directional driver coupled between the collar and the support frame, the driver configured to drive the collar toward and away from the borehole to insert and remove the pipe from the borehole; and
  a removable axle and wheel assembly, wherein the support frame is mounted on the removable axle and wheel assembly for movement of the support frame.

32. The portable pipe thrusting apparatus of claim 31, further comprising a power source and a controller integrated into the support frame, wherein the power source is configured to power the bi-directional driver and the controller is configured to control the bi-directional driver.

33. The portable pipe thrusting apparatus of claim 31, further comprising a power source and a controller integrated into the support frame, wherein the power source is configured to power the removable axle and wheel assembly and the controller is configured to drive the removable axle and wheel assembly.

34. The portable pipe thrusting apparatus of claim 31, further comprising a trailer hitch coupled to a front end of the support frame.

35. The portable pipe thrusting apparatus of claim 31, further comprising at least one vertically adjustable support leg coupled to a lower end of the support frame, wherein the leg is configured to lift the support frame for connection and disconnection of the removable axle and wheel assembly.

36. A thrusting apparatus for assisting a drilling rig during a reaming operation of a borehole, comprising:
  a collar;
  a support frame;
  a bi-directional driver coupled between the collar and the support frame, the driver configured to drive the collar toward and away from the borehole; and
  an auxiliary attachment coupled to the collar and configured to threadedly engage a drill string coupled to the drilling rig,
  wherein the drilling rig is positioned at an entry of the borehole and the thrusting apparatus is positioned at an exit of the borehole.

37. The thrusting apparatus of claim 36, wherein the auxiliary attachment comprises a motor driving a shaft through a clutch mechanism, and wherein the shaft comprises threads for threadedly mating with the drill string.

* * * * *